United States Patent
Sasaki

(10) Patent No.: US 7,982,927 B2
(45) Date of Patent: Jul. 19, 2011

(54) COLOR PROCESSING APPARATUS, COLOR PROCESSING METHOD AND COMPUTER READABLE MEDIUM

(75) Inventor: Makoto Sasaki, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 783 days.

(21) Appl. No.: 11/944,537

(22) Filed: Nov. 23, 2007

(65) Prior Publication Data
US 2008/0309995 A1    Dec. 18, 2008

(30) Foreign Application Priority Data

Jun. 12, 2007 (JP) .................................. 2007-155598

(51) Int. Cl.
- G03F 3/10 (2006.01)
- G06F 15/00 (2006.01)
- H04N 1/46 (2006.01)

(52) U.S. Cl. .......................... 358/518; 358/1.9; 358/525
(58) Field of Classification Search .................. None
See application file for complete search history.

(56) References Cited

U.S. PATENT DOCUMENTS

| 2004/0086176 A1* | 5/2004 | Meier et al. ................... 382/162 |
| 2006/0056683 A1* | 3/2006 | Komatsu ....................... 382/162 |
| 2006/0188156 A1* | 8/2006 | Kwak et al. ................... 382/167 |

FOREIGN PATENT DOCUMENTS

JP    A-02-226870    9/1990
* cited by examiner

*Primary Examiner* — Twyler L Haskins
*Assistant Examiner* — Barbara D Reinier
(74) *Attorney, Agent, or Firm* — Oliff & Berridge, PLC

(57) ABSTRACT

The color processing apparatus includes: a first color signal obtaining unit that obtains a first color signal in a first color space; a color conversion unit that converts the first color signal in the first color space into a second color signal in a second color space according to a color conversion characteristic associating a color signal in the first color space with a color signal in the second color space; a calculation unit that calculates a distance of the first color signal to an outer boundary of a color gamut in the first color space; and a color conversion characteristic generation unit that generates the color conversion characteristic to be used by the color conversion unit to make the conversion. The color conversion characteristic generation unit changes a generation condition of the color conversion characteristic according to the distance of the first color signal.

12 Claims, 11 Drawing Sheets

US 7,982,927 B2

COLOR PROCESSING APPARATUS, COLOR PROCESSING METHOD AND COMPUTER READABLE MEDIUM

CROSS REFERENCE TO RELATED APPLICATIONS

This application is based on and claims priority under 35 USC §119 from Japanese Patent Application No. 2007-155598 filed Jun. 12, 2007.

BACKGROUND

1. Technical Field

The present invention relates to a color processing apparatus, a color processing method and a computer readable medium storing a program.

2. Related Art

Apparatuses for inputting and outputting color images each perform processing of outputting a color image by converting an input color signal, for example, in the RGB color space, into a color signal, for example, in a device-independent L*a*b* color space, and by further converting the resultant color signal into a color signal, for example, in the CMYK color space which is an output color space in the apparatus. As such apparatuses, there are, for example, an image forming apparatus such as a printer, a display such as a liquid crystal display and an image reading apparatus such as a scanner. When performing the out-put processing, each of the apparatuses estimates a color conversion characteristic indicating a correspondence between the CMYK color space and the L*a*b* color space, for example, on the basis of pairs each including actual data pieces actually measured in the CMYK color space, and actual data pieces actually measured in the L*a*b* color space (this pair is called an actual data pair, below). Thus, the apparatus generates colors that do not exist in the actual data pairs.

SUMMARY

According to an aspect of the present invention, there is provided a color processing apparatus including: a first color signal obtaining unit that obtains a first color signal in a first color space; a color conversion unit that converts the first color signal in the first color space obtained by the first color signal obtaining unit into a second color signal in a second color space according to a color conversion characteristic associating a color signal in the first color space with a color signal in the second color space; a calculation-unit that calculates a distance of the first color signal to an outer boundary of a color gamut in the first color space; and a color conversion characteristic generation unit that generates the color conversion characteristic to be used by the color conversion unit to make the conversion. The color conversion characteristic generation unit changes a generation condition of the color conversion characteristic according to the distance of the first color signal calculated by the calculation unit.

BRIEF DESCRIPTION OF THE DRAWINGS

Exemplary embodiment (s) of the present invention will be described in detail based on the following figures, wherein.

DETAILED DESCRIPTION

Hereinbelow, detailed descriptions for exemplary embodiments of the present invention will be given with reference to the accompanying drawings.

First Exemplary Embodiment

Figure 1:
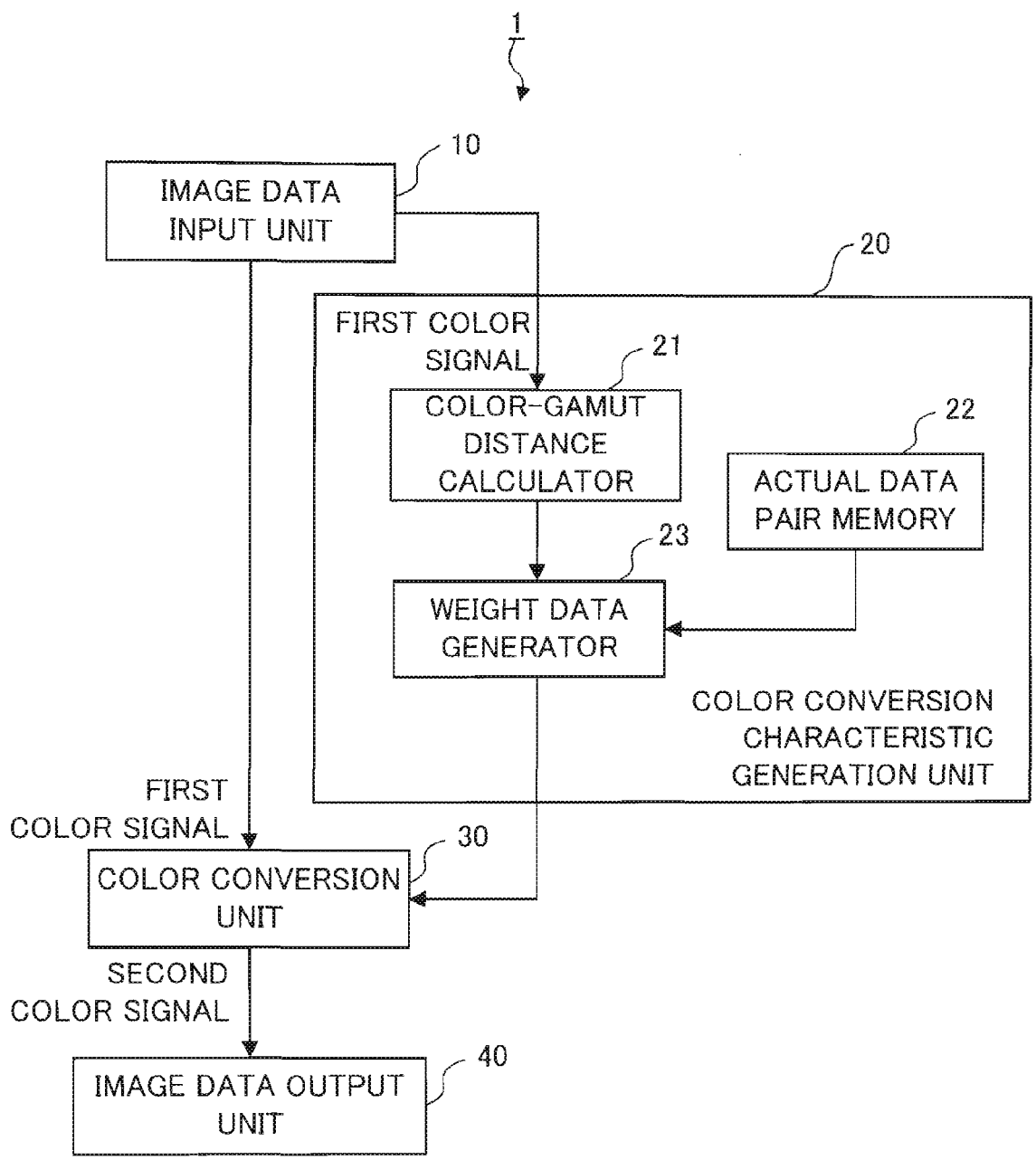
FIG. 1 is a block diagram showing an entire configuration of a color processing apparatus to which the first exemplary embodiment is applied.

FIG. 1 is a block diagram showing an entire configuration of a color processing apparatus 1 to which the first exemplary embodiment is applied. The color processing apparatus 1 in FIG. 1 includes an image data input unit 10, a color conversion characteristic generation unit 20, a color conversion unit 30 and an image data output unit 40.

Note that, in the color processing apparatus 1, a CPU (central processing unit) (not shown in the figure) reads, from a main memory (not shown) to a RAM (random access memory) or the like in the color processing apparatus 1, programs implementing functions of the image data input unit 10, the color conversion characteristic generation unit 20, the color conversion unit 30 and the image data output unit 40, and then performs various kinds of processing.

The image data input unit 10 is an example of a first color signal obtaining unit, and is a functional unit to which a color signal of image data, or a color signal representing each lattice point in a color conversion table is inputted. More specifically, as the color signal of image data, or as the color signal representing the lattice point in the color conversion table, the image data input unit 10 obtains color signals (first color signals), for example, in the CMYK color space that are to be processed in a color image forming apparatus or the like such as a color printer, and is dependent of its device (device-dependent color spaced). Thereafter, the image data input unit 10 outputs the obtained first color signals to the color conversion characteristic generation unit 20 and to the color conversion unit 30.

The color conversion characteristic generation unit 20 is a functional unit, as will be described later, that generates a color conversion characteristic used at the time of color conversion processing in the color conversion unit 30.

The color conversion unit 30 is a functional unit that performs color conversion processing according to the color conversion characteristic generated by the color conversion characteristic generation unit 20. In other words, according to the color conversion characteristic, the color conversion unit 30 converts the first color signals, for example, in the CMYK color space obtained from the image data input unit 10, into color signals (second color signals), for example, in the L*a*b* color space that is a color space independent of the device (device-independent color space) Thereafter, the color conversion unit 30 outputs, to the image data output unit 40, the image data expressed as the second color signals obtained by the conversion.

The image data output unit 40 is a functional unit that outputs the image data to the outside of the color processing apparatus 1. In other words, the image data output unit 40 outputs the image data expressed as the second color signals resulting from the color conversion processing by the color conversion unit 30, to a, functional unit or the like (not shown) that performs processing of converting the image data into data expressed within a color gamut of a color image forming apparatus or the like, for example. A general color image forming apparatus or the like performs processing called a gamut mapping algorithm (GMA) for compressing the color gamut of inputted data into the color gamut specific to the color image forming apparatus. The image data output unit 40 outputs, to such a functional unit or the like that performs the GMA, the image data expressed as the second color signals.

It should be noted that, in the present description, a color signal that is inputted from the image data input unit 10 but not converted yet by the color conversion unit 30 is defined as the "first color signal." Meanwhile, a color signal that is outputted to the image data output unit 40 and is already converted by the color conversion unit 30 is defined as the "second color signal."

Next, an explanation will be given for the color conversion characteristic generation unit 20.

The color conversion characteristic generation unit 20 includes a color-gamut distance calculator 21, an actual data pair memory 22, and a weight data generator 23.

Figure 2:
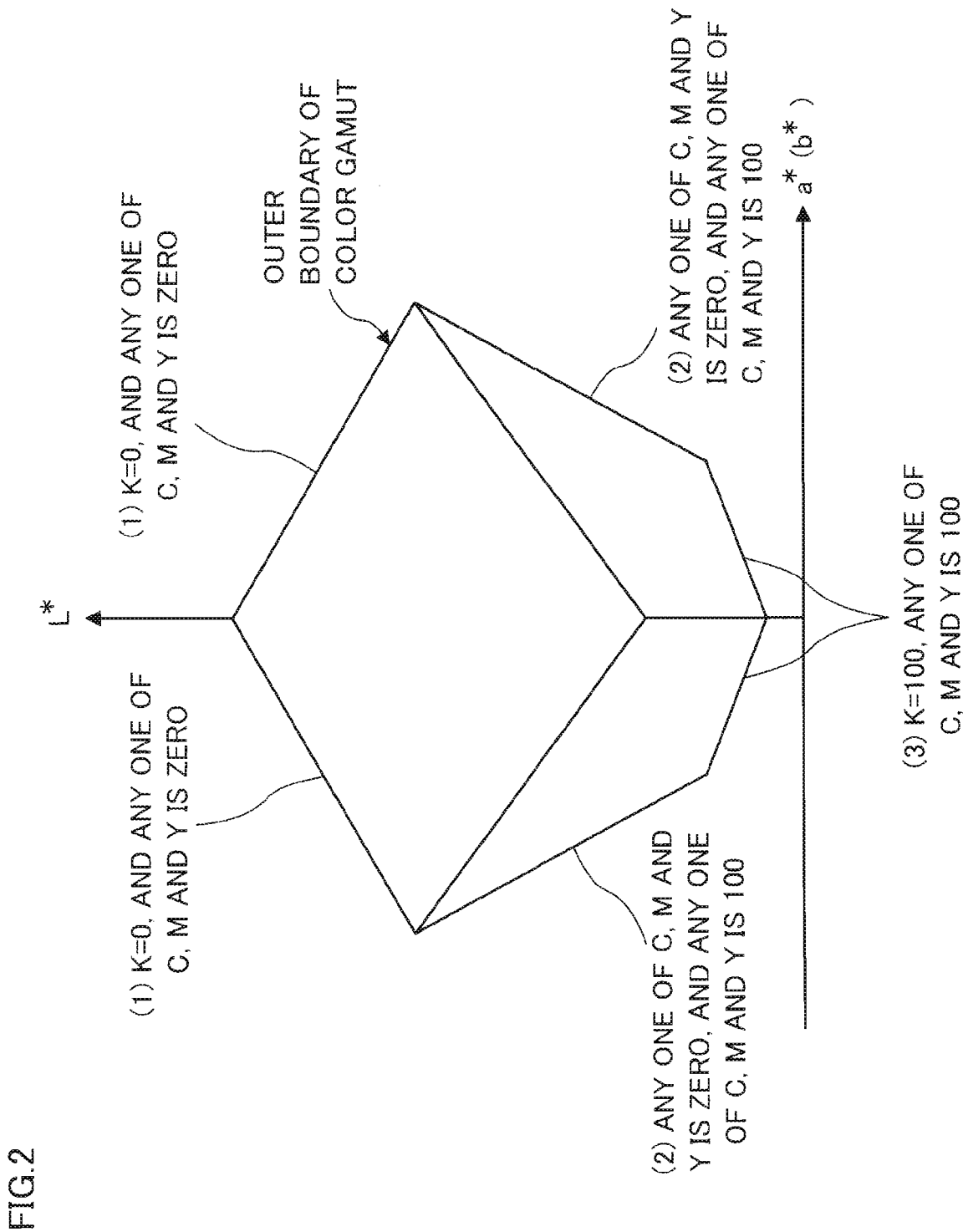
FIG. 2 is a diagram for explaining the outer boundaries of the color gamut in the L*a*b* color space.

The color-gamut distance calculator 21 is an example of a calculation unit, and calculates a distance d of a first color signal to an outer boundary of a color gamut (color difference distance) For example, in a case where a first color signal in the CMYK color space is converted into a second color signal in the L*a*b* color space, outer boundaries of the color gamut in the L*a*b* color space are formed as shown in FIG. 2 (a diagram for explaining the outer boundaries of the color gamut in the L*a*b* color space) There are three patterns, shown below, of color coordinates (C, M, Y, K) in the CMYK color space corresponding to the outer boundaries of the color gamut in the L*a*b* color space shown in FIG.

To be precise, since color coordinates (C, M, Y, K) of the CMYK color space are generally expressed as color-coordinate values of C, M, Y, K=0 to 100, the color coordinates (C, M, Y, K) in accordance with any one of the following three patterns correspond to a coordinate point on one of the outer boundaries of the color gamut of the L*a*b* color space:

(1) K=0, and any one of C, M and Y is 0;
(2) any one of C, M and Y is 0, and any one of C, M and Y is 100; and
(3) K=100, and any one of C, M and Y is 100.

Accordingly, the color difference distance d of the first color signal to the outer boundary of the color gamut may be calculated as the shortest one of the distances between the first color signal and the above-mentioned coordinate points (1) to (3)

Specifically, the color difference distance d of the first color signal to the outer boundary of the color gamut may be figured out as the shortest one of four dimensional Euclidean distances between the first color signal and the above-mentioned coordinate points (1) to (3) by using one of the following ways, for example.

(A) In a case where K≠(not equal) 0 and K≠ (not equal) 100, the maximum value component and the minimum value component of the color components of the first color signal (C, M, Y, K) are extracted. Then, if the maximum value component is K, a color component having the next largest value or having the same value as tale maximum value component K is extracted. Since K is the maximum value component in this case, the minimum four-dimensional Euclidean distance to the first color signal (C, M, Y, K) is given by the outer boundary of the color gamut having K=100 and having the color component of the next largest value or the same value as the maximum value component K (any one of C, M and Y)=100. Specifically, in this case, the color difference distance d to the outer boundary of the color gamut is the four-dimensional Euclidean distance between the first color signal (C, M, Y, K) and any one of the color coordinate points such as (100, M, Y, 100), (C100, Y, 100) and (C, M, 100, 100) on the outer boundaries of the color gamut of the above-mentioned (3).

(B) In a case where K≠(not equal) 0 and K≠(not equal) 100, the maximum value component and the minimum value component of the color components of the first color signal (C, M, Y, K) are extracted. Then, if the minimum value component is K, a color component having the next smallest value or having the same value as the minimum value component K is extracted. Since K is the minimum value component in this case, the minimum four-dimensional Euclidean distance to the first color signal (C, M, Y, K) is given by the outer boundary of the color gamut having K=0 and having the color component of the next smallest value or the same value as the minimum value component K (any one of C, M and Y)=0. Specifically, in this case, the color difference distance d to the outer boundary of the color gamut is the four-dimensional Euclidean distance between the first color signal (C, M, Y, K) and any one of the color coordinate points such as (0, M, Y, 0), (C, 0, Y, 0) and (C, M, 0, 0) on the outer boundaries of the color gamut of the above-mentioned (1).

(C) In a case where K≠(not equal) 0 and K≠(not equal), 100, the maximum value component and the minimum value component of the color components of the first color signal (C, M, Y, K) are extracted. Then, if neither of the maximum value component nor the minimum value component is K, the minimum four-dimensional Euclidean distance to the first color signal (C, M, Y, K) is given by the outer boundary of the color gamut having the color component of the maximum value component (any one of C, M, and Y)=100 and the color component of the minimum value component (any one of C, M and Y)=0. Specifically, in this case, the color difference distance d to the outer boundary of the color gamut is the four-dimensional Euclidean distance between the first color signal (C, M, Y, K) and any one of the color coordinate points such as (0, 100, Y, K), (0, M, 100, K), (100, 0, Y, K), (100, M, 0, K), and the like on th,e outer boundary of the color gamut of the above-mentioned (2).

(D) In a case where K=0, the minimum value component of the C, M, and Y color components of the first color signal (C, M, Y, K) are extracted. In this case, the minimum four-dimensional Euclidean distance to the first color signal (C, M, Y, K) is given by the outer boundary of the color gamut having the color component having the minimum value component (any one of C, M and Y)=0. Specifically, the color difference distance d to the outer boundary of the color gamut is the four-dimensional Euclidean distance between the first color signal (C, M, Y, K) and any one of the color coordinate points such as (0, M, Y, 0), (C, 0, Y, 0) and (C, M, 0, 0) on the outer boundaries of the color gamut of the above-mentioned (1).

(E) In a case where K=100 the maximum value component of the C, M, and Y color components of the first color signal (C, M, Y, K) are extracted. In this case, the minimum four-dimensional Euclidean distance to the first color signal (C, M, Y, K) is given by the outer boundary of the color gamut having the color component having the maximum value component (any one of C, M and Y)=100. Specifically, the color difference distance d to the outer boundary of the color gamut is the four-dimensional Euclidean distance between the first color signal (C, M, Y, K) and any one of the color coordinate points such as (100, M, Y, 100), (C, 100, Y, 100) and (C, M, 100, 100) on the outer boundaries of the color gamut of the above-mentioned (3).

Here, an exemplar calculation is given for a color difference distance d of a first color signal to an outer boundary of a gamut. For example, in a case where the first color signal is (C, M, Y, K)=(90, 95, 80, 100), the above (E) is applicable, and the color difference distance d to the outer boundary of the color gamut is the four-dimensional Euclidean distance to a color coordinate point on the above-mentioned outer boundary of the color gamut (3). More precisely, since the maximum value component of the color components C, M, and Y is 95 of the component M, the color difference distance d is calculated as the distance between the first color signal (90, 95, 800, 100) and the color coordinate point (90, 100, 80, 100) having the component M set to 100 on the outer boundary of the color gamut. Namely, the following Equation 1 gives the color difference distance d to the outer boundary of the color gamut $$d = \sqrt{(90-90)^2 + (100-95)^2 + (80-80)^2 + (100-100)^2} \quad (1)$$
$$= \sqrt{5^2}$$
$$= 5$$

Further, for example, in a case where the first color signal is (C, M, Y, K)=(100, 5, 80, 20), the above (C) is applicable, and the color difference distance d to the outer boundary of the color gamut is the four-dimensional Euclidean distance to a color coordinate point on the above-mentioned outer boundary of the color gamut (2). More precisely, since the maximum value component of the color components C, M, and Y is 100 of the component C and the minimum value component of the color components C, M, and Y is 5 of the component M, the color difference distance d is calculated as the distance between the first color signal (100, 5, 80, 20) and the color coordinate point (100, 0, 80, 20) having the component M set to 0 on the outer boundary of the color gamut. Namely, the following Equation 2 gives the color difference distance d to the outer boundary of the color gamut.

$$d = \sqrt{(100-100)^2 + (5-0)^2 + (80-80)^2 + (20-20)^2} \quad (2)$$
$$= \sqrt{5^2}$$
$$= 5$$

Furthermore, for example, in a case where the first color signal is (C, M, Y, K)=(95, 20, 80, 95), the above (A) is applicable, and the color difference distance d to the outer boundary of the color gamut is the four-dimensional Euclidean distance to a color coordinate point on the above-mentioned outer boundary of the color gamut (3). More precisely, since the maximum value component is K and a color component having the next largest value or having the same value as the maximum value component K is 95 of the component C, the color difference distance d is calculated as the distance between the first color signal (95, 20, 80, 95) and the color coordinate point (100, 20, 80, 100) having the components K and C set to 100 on the outer boundary of the color gamut. Namely, the following Equation 3 gives the color difference distance d to the outer boundary of the color gamut.

$$d = \sqrt{(100-95)^2 + (20-20)^2 + (80-80)^2 + (100-95)^2} \quad (3)$$
$$= \sqrt{5^2 + 5^2}$$
$$= \sqrt{50}$$

Note that the calculation method for the color difference distance d of the first color signal to the outer boundary of the color gamut is not limited to the above method, and that any method may be employed, as long as the method is one that calculates the distance of the first color signal to the outer boundary of the color gamut.

Incidentally, in a case where the first color signal represents color coordinates (R, G, B) in the RGB color pace, the coordinates are generally expressed as coordinate values of R, G, B=0 to 255. For this reason, in this case, color coordinates (R, G, B) in which any one of R, G, and B is equal to 0 or 255 correspond to a coordinate point on the outer boundary of the color gamut in the L*a*b* color space.

Subsequently, the actual data pair memory 22 stores therein multiple actual data pairs each composed of actual data sets in two different color spaces corresponding to each other. Here, the different color spaces are targeted for a color conversion characteristic estimation that is to be actually performed in the color conversion unit 30. To be specifics the actual data pair memory 22 stores n actual data sets $(x_{1i}, x_{2i}, x_{3i}, x_{4i})$ expressed in the CMYK color space, for example, which are input signals (first color signals) and n actual data sets $(y_{1i}, y_{2i}, y_{3i})$ expressed in the L*a*b* color space, for example, which are output signals (second color signals) corresponding to the input signals. Here, n and i each are an integer, and i=1 to n (the same is applied below).

In the case of a color image forming apparatus, for example, various combinations of color signals (C, M, Y, K) in the CMYK color space are processed and printed to make color patches (color samples), and then the color of each of the color patches is measured (color measuring) as coordinates in the L*a*b* color space, for example. Hence, prepared is an actual data pair of an actual data set representing the input signal (C, M, Y, K) for each color patch, and an actual data set representing the color coordinates (L*, a*, b*) in the L*a*b* color space obtained by measuring the color patch that is the output image. Then, the actual data pair memory 22 stores therein the actual data pairs each consisting of the actual data set of the input signal (C, M, Y, K) and the actual data set of the color coordinates (L*, a*, b*) of the output image corresponding to the input signal.

The weight data generator 23 is an example of a color conversion characteristic generation unit that obtains the actual data pairs from the actual data pair memory 22, and controls weight (weighting) of the actual data pairs for estimating the color conversion characteristic in the color conversion unit 30. Here, the weight is controlled according to the color difference distance d, calculated in the color-gamut distance calculator 21, of the first color signal (input signal) to the outer boundary of the color gamut.

Here, first of all, an explanation will be given for an estimation of a color conversion characteristic made in the color processing apparatus 1 according to the first exemplary embodiment. The color processing apparatus 1 estimates a color conversion characteristic specific to a color image forming apparatus, for example, and generates, according to the estimated color conversion characteristic, a second color signal from an inputted first color signal. In other words, the color processing apparatus 1 estimates the color conversion characteristic indicating a correspondence between a color signal (C, M, Y, K) in the CMYK color space and color coordinates (L*, a*, b*) in the L*a*b* color space by use of the above-mentioned actual data pairs. Then, according to these color conversion characteristic, the color processing apparatus 1 generates colors which are not included in the actual data pair.

The following shows an exemplar case of estimating a color conversion characteristic indicating a correspondence of a color signal (C, M, Y, K) in the four-dimensional CMYK color space as a first color signal, with a color signal (L*, a*, b*) in the three-dimensional L*a*b* color space as a second color signal. It should be noted that the following case is similarly applicable to the case of estimating a color conversion characteristic indicating a correspondence of a color signal (R, G, B) in the three-dimensional RGB color space, for example, with color coordinates (L*, a*, b*) in the three-dimensional L*a*b* color space, for example.

In a case where the first color signal is of four-dimensional data of the CMYK color space, and the second color signal is of three-dimensional data of the La*b* color space, the color processing apparatus 1 associates n actual data sets $(x_{1i}, x_{2i}, x_{3i}, x_{4i})$ of the first color signals with output estimation values thereof $(y'_{1i}, y'_{2i}, y'_{3i})$ by use of a matrix having components of $m_{11}, m_{12}, m_{13}, m_{14}, \ldots$, so as to form a linear relation including a constant term, as shown in Equation 4 below.

$$\begin{pmatrix} y'_{1i} \\ y'_{2i} \\ y'_{3i} \end{pmatrix} = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \end{pmatrix} \begin{pmatrix} x_{1i} \\ x_{2i} \\ x_{3i} \\ x_{4i} \\ 1 \end{pmatrix} \quad (3)$$

Then, by use of the following Equation 5, obtained is a sum of squares $E_j$ of weighted Euclidean distances between the output estimation values $(y'_{1i}, y'_{2i}, y'_{3i})$ obtained from the actual data sets $(x_{1i}, x_{2i}, x_{3i}, x_{4i})$ of the first color signals by use of the matrix in Equation 4, and the actual data sets $(y_{1i}, y_{2i}, y_{3i})$ of the second color signals corresponding to the actual data sets $(x_{1i}, x_{2i}, x_{3i}, x_{4i})$ of the first color signals.

Here, $W_{ij}$ denotes a weighting coefficient (also referred to as "weight" below) for the Euclidean distance between the output estimation values $(y'_{1i}, y'_{2i}, y'_{3i})$ obtained from the actual data set $(x_{1i}, x_{2i}, x_{3i}, x_{4i})$ of the first color signal by use of the matrix in equation 4, and the actual data set $(y_{1i}, y_{2i}, y_{3i})$ of the second color signal.

$$E_j = \sum_{i=0}^{n} (W_{ij}^2 ((y'_{1i} - y_{1i})^2 + (y'_{2i} - y_{2i})^2 + (y'_{3i} - y_{3i})^2)) \quad (5)$$

Meanwhile, by use of the following equation 6, the second color signal $(y_{1j}, y_{2j}, y_{3j})$ that is estimated values is obtained from the first color signal $(x_{1j}, x_{2j}, x_{3j}, x_{4j})$ that is values based on which the estimation is made (such values are called estimation-base values, below). The matrix in Equation 6 is the same as that in Equation 4. If the estimation-base values are the first color signal $(x_{1j}, x_{2j}, x_{3j}, x_{4j})$, the estimated values of the second color signal $(y_{1j}, y_{2j}, y_{3j})$ are obtained by substituting estimation-base values into Equation 6.

$$\begin{pmatrix} y_{1j} \\ y_{2j} \\ y_{3j} \end{pmatrix} = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \end{pmatrix} \begin{pmatrix} x_{1j} \\ x_{2j} \\ x_{3j} \\ x_{4j} \\ 1 \end{pmatrix} \quad (6)$$

Subsequently, by use of a known method termed as the least square method, each of matrix components $m_{11}, m_{12}, m_{13}, m_{14}, \ldots$, is obtained under the condition of minimizing $E_j$ where the weight $W_{ij}$ is fixed. In the case where the weight $W_{ij}$ depends on the matrix components or the second color signal that is the estimated values, each of the matrix components $m_{11}, m_{12}, m_{13}, m_{14}, \ldots$, cannot be uniquely determined. Accordingly, in this case, under the condition of minimizing $E_j$ in Equation 5, the weight $W_{ij}$, each of the matrix components $m_{11}, m_{12}, m_{13}, m_{14}, \ldots$, and the optimal values of estimated values are determined by use of the iteration method.

Note that, in the color processing apparatus 1 of the first exemplary embodiment, the matrix in Equation 6 thus obtained is set in the color conversion unit 30. Then, the color conversion unit 30 calculates the second color signal $(y_{1j}, y_{2j}, y_{3j})$ that is the estimated values, from the first color signal $(x_{1j}, x_{2j}, x_{3j}, x_{4j})$ that is the estimation-base values based on Equation 6.

The weight $W_{ij}$ of the first exemplary embodiment is composed of a first function $F_{ij}$ and a second function $G_{ij}$, each of which is a monotonically decreasing function.

The first function $F_{ij}$ is used to normalize a difference between each pair of corresponding signal components of the first color signal $(x_{1j}, x_{2j}, x_{3j}, x_{4j})$ of the estimation-base values, and of the actual data set $(x_{1i}, x_{2i}, x_{3i}, x_{4i})$ of the first color signal. Then, the first function $F_{ij}$ defines weight $W_{ij}$ that monotonously decreases according to the Euclidean distance to the normalized signal composed of these normalized difference components.

In addition, the second function $G_{ij}$ is used to convert a difference between each pair of corresponding signal components of the estimation-base values $(x_{1j}, x_{2j}, x_{3j}, x_{4j})$ of the first color signal and of the actual data set $(x_{1i}, x_{2i}, x_{3i}, x_{4i})$ of the first color signal, into a difference component having sensitivity taken into consideration by use of each matrix component in Equations 4 and 6. Then, these difference components are normalized. After that, the second function $G_{ij}$ defines weight $W_{ij}$ that monotonously decreases according to the Euclidean distance to the normalized signal composed of the difference components having the sensitivity taken into consideration.

In this way, the weight $W_{ij}$ are defined by use of the two monotonously decreasing functions depending on the Euclidean distance, that is, the first function $F_{ij}$ and the second function $G_{ij}$. Thereby, an actual data pair having a large difference in distance (color difference) in the color space is made less influential by making the weight $W_{ij}$ smaller, while an actual data pair having a small color difference is treated as important data by making the weight $W_{ij}$ larger. In addition, since the first function $F_{ij}$ and the second function $G_{ij}$ are the monotonously decreasing function, the continuity of the estimated values is secured in principle, and a coefficient for color processing, for example, in a color image forming apparatus is determined without considering local discontinuities.

Here, a specific example will be described for calculating the estimated values from the estimation-base values by using Equations 7 to 9, which are shown below. In this specific example, the three-dimensional second color signal $(y_{1j}, y_{2j}, y_{3j})$ of the estimated values is estimated based on the four-dimensional first color signal $(x_{1j}, x_{2j}, x_{3j}, x_{4j})$ of the estimation-base values.

$$W_{1ij} = F_{ij}(((x_{1i} - x_{1j})/x_{10})^2 + \qquad (7)$$
$$((x_{2i} - x_{2j})/x_{20})^2 + ((x_{3i} - x_{3j})/x_{30})^2 + ((x_{4i} - x_{4j})/x_{40})^2)$$

$$W_{2ij} = G_{ij}(((m_{11}(x_{1i} - x_{1j}))^2 + (m_{12}(x_{2i} - x_{2j}))^2 + \qquad (8)$$
$$(m_{13}(x_{3i} - x_{3j}))^2 + (m_{14}(x_{4i} - x_{4j}))^2)/(y_{i0})^2 +$$
$$((m_{21}(x_{1i} - x_{1j}))^2 + (m_{22}(x_{2i} - x_{2j}))^2 + (m_{23}(x_{3i} - x_{3j}))^2 +$$
$$(m_{24}(x_{4i} - x_{4j}))^2)/(y_{20})^2 +$$
$$((m_{31}(x_{1i} - x_{1j}))^2 + (m_{32}(x_{2i} - x_{2j}))^2 + (m_{33}(x_{3i} - x_{3j}))^2 +$$
$$(m_{34}(x_{4i} - x_{4j}))^2)/(y_{30})^2)$$

$$W_{12ij} = H(W_{1ij}, W_{2ij}) \qquad (9)$$

Firstly, Equation 7 shows that first weight $W_{1ij}$ is set by use of the first function $F_{ij}$ that is the monotonously decreasing function of the normalized signal with respect to the Euclidean distance. Here, the normalized signal is obtained by normalizing each difference component of the first color signal, that is, a difference between each pair of corresponding signal components of the first color signal $(x_{1j}, x_{2j}, x_{3j}, x_{4j})$ of the estimation-base values and the actual data set $(x_{1i}, x_{2i}, x_{3i}, x_{4i})$ of the first color signal.

In Equation 7, firstly obtained are the differences $(x_{1i}-x_{1j})$, $(x_{2i}-x_{2j})$, $(x_{3i}-x_{3j})$, $(x_{4i}-x_{4j})$ between all the pairs of signal components of the first color signal $(x_{1j}, x_{2j}, x_{3j}, x_{4j})$ and the actual data $(x_{1i}, x_{2i}, x_{3i}, x_{4i})$. Thereafter, The differences $(x_{1i}-x_{1j})$, $(x_{2i}-x_{2j})$, $(x_{3i}-x_{3j})$, $(x_{4i}-x_{4j})$ are normalized by use of constants for normalization $(x_{10}, x_{20}, x_{30}, x_{40})$, thereby obtaining $(x_{1i}-x_{1j})/x_{10}$, $(x_{2i}-x_{2j})/x_{20}$, $(x_{3i}-x_{3j})/x_{30}$, $(x_{4i}-x_{4j})/x_{40}$. Then, the first weight $W_{1ij}$ is set by using, as a parameter of the first function $F_{ij}$, a sum of squares of these normalized differences.

Next, Equation 8 shows that second weight $W_{2ij}$ is set by use of the second function $G_{ij}$ that is the monotonously decreasing function of another normalized signal with respect to the Euclidean distance. Here, the normalized signal is obtained by firstly converting differences between all the pairs of signal components of the first color signal $(x_{1j}, x_{2j}, x_{3j}, x_{4j})$ of the estimation-base values and the actual data set $(x_{1i}, x_{2i}, x_{3i}, x_{4i})$ of the first color signal are firstly converted into the difference components having the sensitivity taken into consideration by use of the respective matrix component in Equations 4 and 6, and then by normalizing the resultant difference components. Here, the conversion into the difference components having the sensitivity taken into consideration is defined as a calculation in which: differences between each pair of signal components of the first color signal $(x_{1j}, x_{2j}, x_{3j}, x_{4j})$ and the actual data set $(x_{1i}, x_{2i}, x_{3i}, x_{4i})$ is multiplied by a corresponding one of the matrix components; the resultant value of each signal component is squared; and then the total sum of the resultant values of all the signal components is calculated. Here, the second function $G_{ij}$ is configured not to depend on a plus or minus sign of each signal component by calculating the squared value of each term, and to take the sensitivity of each term into consideration by use of the absolute value of the term.

In Equation 8, firstly, obtained are differences $(x_{1i}-x_{1j})$, $(x_{2i}-x_{2j})$, $(x_{3i}-x_{3j})$, $(x_{4i}-x_{4j})$ between all the signal components of the first color signal $(x_{1j}, x_{2j}, x_{3j}, x_{4j})$ of the estimation-base values and the actual data set $(x_{1i}, x_{2i}, x_{3i}, x_{4i})$ of the first color signal. Although the differences may be converted into the signal components In the output space by multiplying these differences by corresponding matrix components, the calculation here is to firstly multiply each of the differences by a corresponding one of the matrix components, to multiply each of the resultant differences by itself, and then to sum up the resultant values. More precisely, firstly calculated are $(m_{11}(x_{1i}-x_{1j}))^2+(m_{12}(x_{2i}-x_{2j}))^2+(m_{13}(x_{3i}-x_{3j}))^2+(m_{14}(x_{4i}-x_{4j}))^2$, $(m_{21}(x_{1i}-x_{1j}))^2+(m_{22}(x_{2i}-x_{2j}))^2+(m_{23}(x_{3i}-x_{3j}))^2+(m_{24}(x_{4i}-x_{4j}))^2$ and $(m_{31}(x_{1i}-x_{1j}))^2+(m_{32}(x_{2i}-x_{2j}))^2+(m_{33}(x_{3i}-x_{3j}))^2+(m_{34}(x_{4i}-x_{4j}))^2$. Then, by use of constants for normalization $(y_{10}, y_{20}, y_{30})$ these are respectively divided by $(y_{10})^2$, $(y_{20})^2$, $(y_{30})^2$, thereby being normalized. Thereafter, the normalized values are summed up, and are used as the parameter for the second function $G_{ij}$ that is the monotonously decreasing function. In this way, the second weight $W_{2ij}$ is determined.

The following Equation 9 shows that a weighting coefficient (weight) $W_{ij}$ set by combining the forgoing two monotonously decreasing functions, that is, the first function $F_{ij}$ and the second function $G_{ij}$. Here, these two functions are combined so as not to lose the characteristics that the two functions, first, function $F_{ij}$ and second function $G_{ij}$, are the monotonously decreasing functions depending on the Euclidean distance. For example, a mathematic operation such as addition or multiplication is used.

The $W_{12ij}$ obtained with Equation 9 is the weight $W_{ij}$ in Equation 5. Then, by use of this weight $W_{ij}$, the matrix components $m_{11}$, $m_{12}$, $m_{13}$, $m_{14}$, . . . are figured out in the least square method, so as to minimize $E_j$ shown in Equation 5. The color conversion characteristic generation unit 20 generates such matrix components $m_{11}$, $m_{12}$, $m_{13}$, $m_{14}$.

Then, the color conversion characteristic generation unit 20 sets the matrix composed of the generated components $m_{11}$, $m_{12}$, $m_{13}$, $m_{14}$, . . . in the color conversion unit 30. The color conversion unit 30 calculates the estimated values with Equation 6 using the set matrix. The color conversion unit 30 also transmits the estimated values thus calculated to the color conversion characteristic generation unit 20, if needed. The color conversion characteristic generation unit 20 again calculates the weight $W_{ij}$ by using the estimated values calculated by the color conversion unit 30, then obtains a matrix composed of components $m_{11}$, $m_{12}$, $m_{13}$, $m_{14}$, . . . that minimize $E_j$, and finally again sets the obtained matrix in the color conversion unit 30. The color conversion unit 30 again calculates the estimated values by use of the newly-obtained matrix. The color processing apparatus 1 repeats this processing to converge each of the estimated values, and consequently obtains desirable estimated values.

Here, the descriptions are returned to the weight data generator 23. As described above, the weight data generator 23 obtains the actual data pair of $((x_{1i}, x_{2i}, x_{3i}, x_{4i}), (y_{1i}, y_{2i}, y_{3i}))$ from the actual data pair memory 22. From the color-gamut distance calculator 21, the weight data generator 23 obtains the color difference distance d of the first color signal to the outer boundary of the color gamut. Then, according to the color difference distance d of the first color signal to the outer boundary of the color gamut, the weight data generator 23 controls weight (weighting) to be assigned to the actual data pair when the color conversion unit 30 estimates the color conversion characteristic.

Equation 6 is used to estimates the color conversion characteristic by the color conversion unit 30. By using the first function $F_{ij}$ and the second function $G_{ij}$ that are the monotonously decreasing functions, as shown in Equations 5, 7 and 8, the matrix of Equation 6 is generated so that smaller weight would be given to actual data pairs each having a larger distance difference (color difference) to the first color signal $(x_{1j}, x^{2j}, x_{3j}, x_{4j})$, which includes the estimation-base values, in the color space, while larger weight would be given to actual data pairs each having a smaller color difference in the color space. With this weight, a local linear regression analysis is performed around the first color signal $x_{1j}, x_{2j}, x_{3j}, x_{4j}$), and consequently the color conversion characteristic is estimated.

On the other hand, since there is no actual data pair outside the outer boundary of the color gamut, the presence and absence of actual data pairs change drastically around the outer boundary of the color gamut. For this reason, if actual data pairs are weighed for the first color signal $(x_{1j}, x_{2j}, x_{3j}, x_{4j})$ around the outer boundary of the color gamut in the same manner as that for the first color signal far from the outer boundary of the color gamut, the accuracy for estimating the color conversion for the first color signal $x_{1j}, x_{2j}, x_{3j}, x_{4j})$ around the outer boundary of the color gamut is reduced.

Figure 3:
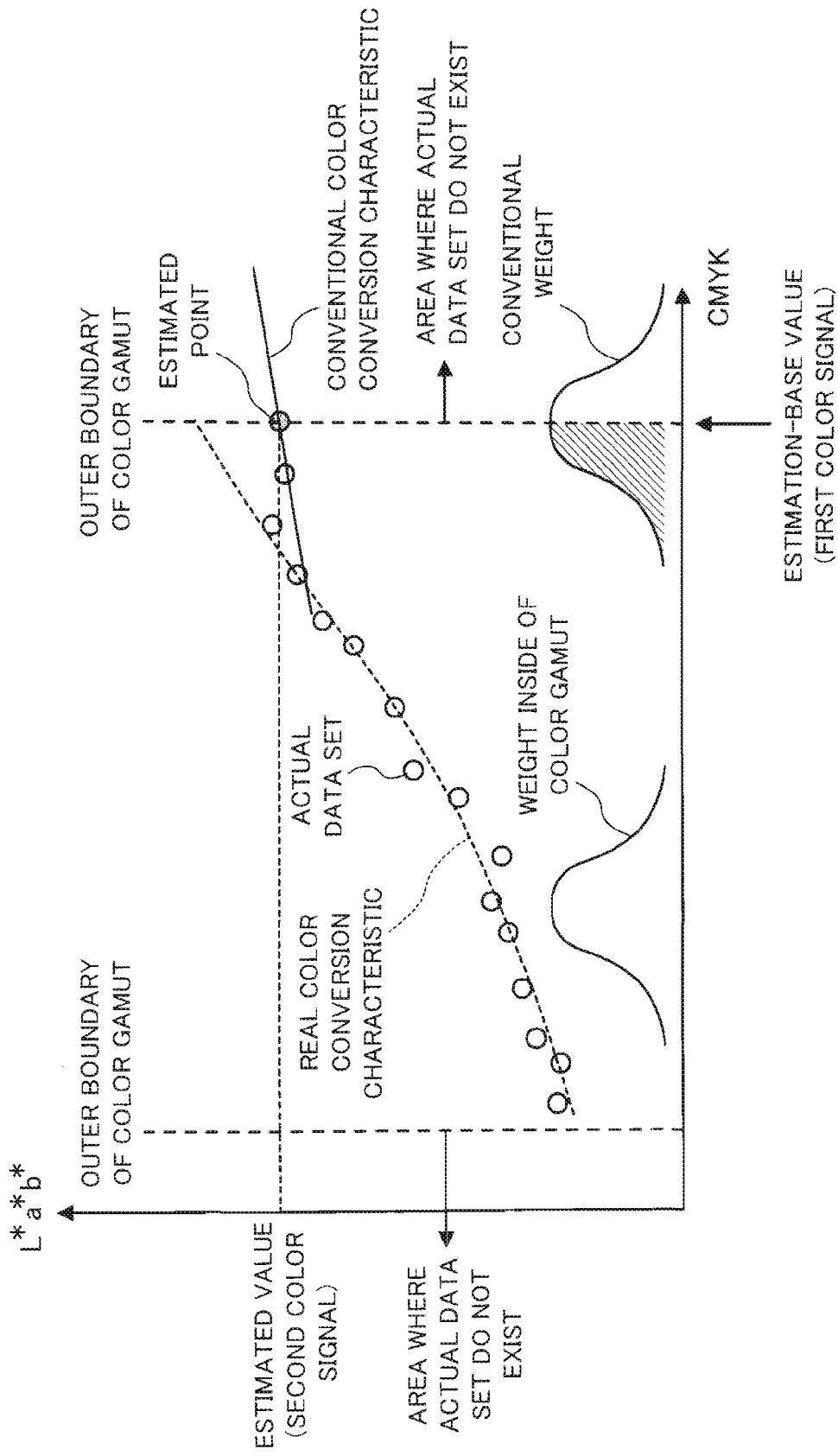
FIG. 3 is a diagram showing a color conversion characteristic in a case where actual data pairs are weighted for the first color signal ($x_{1j}$, $x_{2j}$, $x_{3j}$, $x_{4j}$) around the outer boundary of the color gamut in the same manner as that for the first color signal far from the outer boundary of the color gamut.

For example, FIG. 3 is a diagram showing a color conversion characteristic in a case where actual data pairs are weighted for the first color signal $(x_{1j}, x_{2j}, x_{3j}, x_{4j})$ around the outer boundary of the color gamut in the same manner as that for the first color signal far from the outer boundary of the color gamut. In FIG. 3, the horizontal axis indicates color coordinates in the CMYK color space for the first color signal, and the vertical axis indicates color coordinates in the L*a*b* color space for the second color signal. The same axes are also used in FIGS. 4, 6, 9 and 11.

As shown in FIG. 3, around the outer boundary of the color gamut, only the actual data pairs inside the outer boundary of the color gamut are weighted. As a result, the calculated estimated values are lower than the real values of the color conversion characteristic.

More precisely, the weight $W_{ij}$ in Equation 5 is set, with the center thereof taken as the first color signal $(x_{1j}, x_{2j}, x_{3j}, x_{4j})$, by use of the first function $F_{ij}$ and the second function $G_{ij}$ that are the monotonously decreasing functions depending on the Euclidean distance of the first color signal $(x_{1j}, x_{2j}, x_{3j}, x_{4j})$ to the actual data sets $(x_{1i}, x_{2i}, x_{3i}, x_{4i})$ of the first color signal. Then, the sum of squares $E_j$ in Equation 5 is calculated by use of such weight $W_{ij}$. Around the outer boundary of the color gamut outside which no actual data pair exists, however, no square-sum component outside the outer boundary of the color gamut is added to the sum of squares $E_j$.

For example, as shown in FIG. 3, for a certain first color signal located far from the outer boundary of the color gamut (called the inside of the color gamut), the sum of squares $E_j$ in Equation 5 is calculated by assigning the weight $W_{ij}$ to the actual data sets $(x_{1i}, x_{2i}, x_{3i}, x_{4i})$ located on both sides of the first color signal $(x_{1j}, x_{2j}, x_{3j}, x_{4j})$, that is, the sides having larger color values and having smaller color values. On the other hand, as for a first color signal located around the outer boundary of the color gamut, no actual data pair exists outside the outer boundary of the color gamut. Accordingly, the sum of squares $E_j$ in Equation 5 is calculated only by assigning the weight $W_{ij}$ to the actual data sets $(x_{1i}, x_{2i}, x_{3i}, x_{4i})$ located on a side of the first color signal $(x_{1j}, x_{2j}, x_{3j}, x_{4j})$, that is, the side having smaller color values (the shaded area in FIG. 3). Thus, a local liner regression analysis for the first color signal located around the outer boundary of the color gamut is performed with the sum of squares $E_j$ to which no square-sum component outside the outer boundary of the color gamut is added. As a result, the calculated estimated values (the estimated point shown in FIG. 3) are smaller than the values of the real color conversion characteristic.

For this reason, the weight data generator 23 of the first exemplary embodiment controls the weight (weighting) to be assigned to the actual data pairs when the color conversion characteristic is estimated by the color conversion unit 30 according to the color difference distance d between the first color signal and the outer boundary of the color gamut that is obtained by the color-gamut distance calculator 21.

More precisely, the weight data generator 23 of the first exemplary embodiment generates the first function $F_{ij}$ and the second function $G_{ij}$ to assign the weight $W_{ij}$ within a predetermined range of the color difference distance d so that the weight $W_{ij}$ would be assigned to actual data sets in a wider area as the color difference distance d is smaller. Here, the color difference distance d is a distance between the first color signal and the outer boundary of the color gamut, and is obtained from the color-gamut distance calculator 21.

In other words, the weight data generator 23 generates the first function $F_{ij}$ and the second function $G_{ij}$ such that, the smaller the color difference distance d is, the wider the area including actual data pairs to be assigned the weight $W_{ij}$ would be.

Then, the weight data generator 23 calculates the weight $W_{12ij}$ $(=W_{ij})$ with Equation 9 by using the generated first function $F_{ij}$ and the second function $G_{ij}$. Thereafter, the matrix components $m_{11}, m_{12}, m_{13}, m_{14}, \ldots,$ that minimize $E_j$ shown in Equation 5 are figured out in the least square method using this weight $W_j$. Then, the weight data generator 23 generates a matrix composed of the components $m_{11}, m_{12}, m_{13}, m_{14}, \ldots,$ and then sends the generated matrix to the color conversion unit 30.

Figure 4:
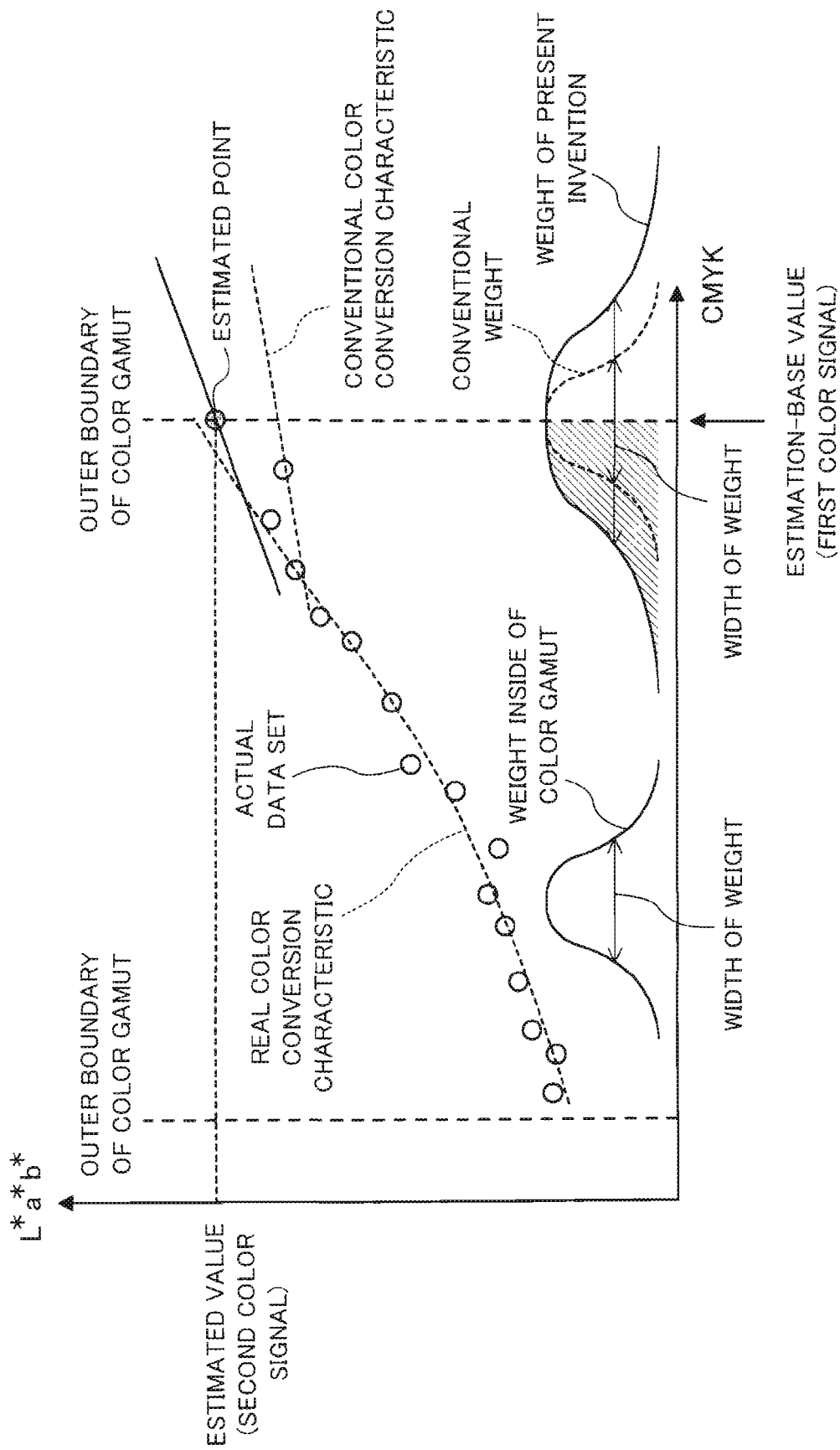
FIG. 4 is a diagram for explaining the weight determined by the first function and the second function generated by the weight data generator of the first exemplary embodiment.

FIG. 4 is a diagram for explaining the weight determined by the first function $F_{ij}$ and the second function $G_{ij}$ generated by the weight data generator 23 of the first exemplary embodiment. As shown in FIG. 4, in an area where the color difference distance d between the first color signal and the outer boundary of the color gamut is within the predetermined range, the wider weight $W_{ij}$ is set to be assigned to actual data sets in a wider area as the color difference distance d is smaller, by the first function $F_{ij}$ and the second function $G_{ij}$ generated by the weight data generator 23 of the first exemplary embodiment. The sum of squares $E_{ij}$ in Equation 5 is calculated with the weight $W_{ij}$ assigned to the actual data sets $(x_{1i}, x_{2i}, x_{3i}, x_{4i})$ in the wider area (a shaded area in FIG. 4) than the area where the conventional weight $W_{ij}$ is assigned to the actual, data sets, the wider area located on the side having smaller color values than that on the outer boundary of the color gamut. Then, the estimated values for the first color signal located around the outer boundary of the color gamut are calculated by performing the local liner regression analysis using the calculated sum of squares $E_j$. This calculation allows the estimated values (an estimated point shown in FIG. 4) to have values closer to the real color conversion characteristic.

Figure 5:
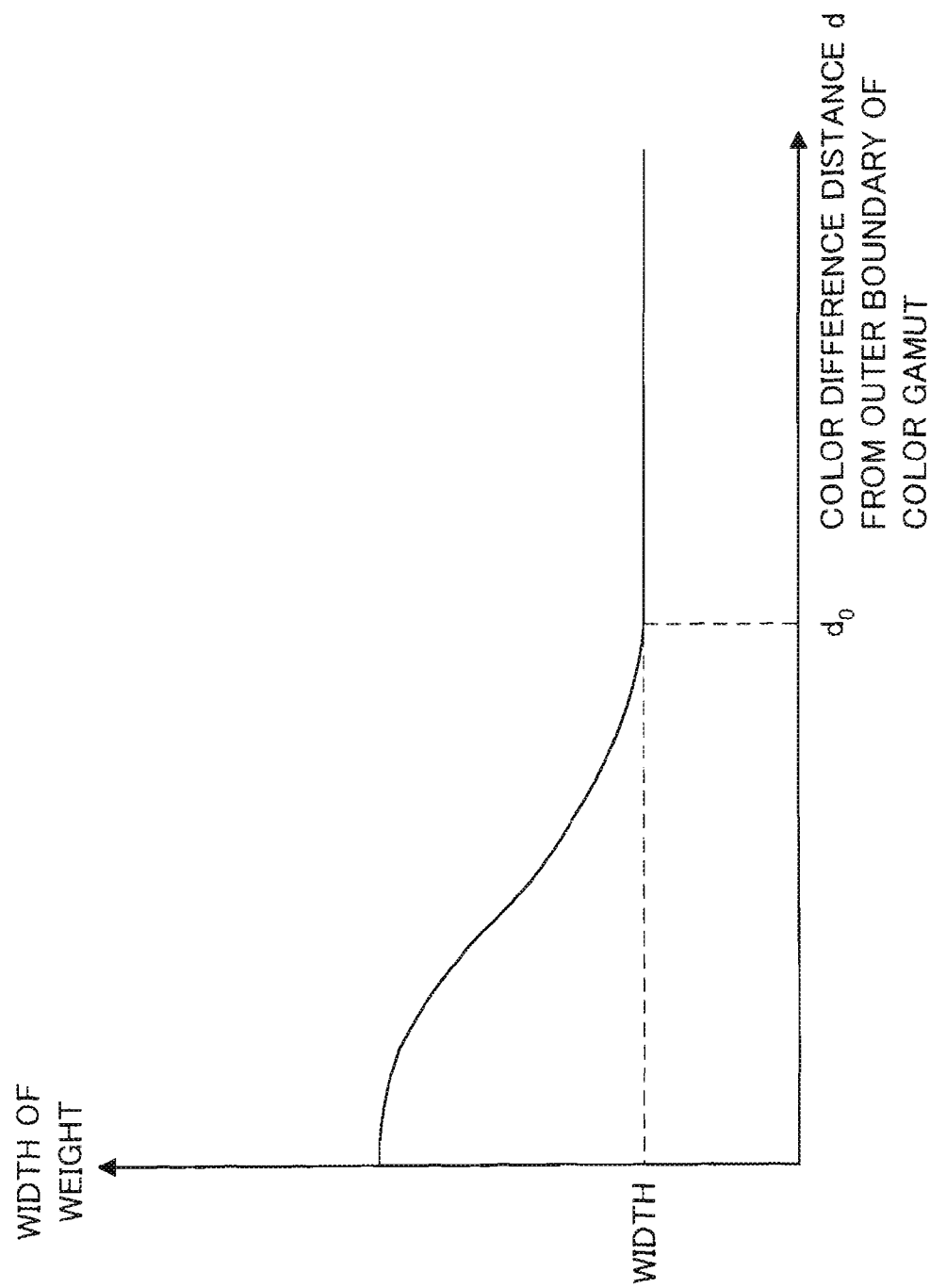
FIG. 5 is a diagram for schematically explaining a relation between the width of the weight and the color difference distance of the first color signal to the outer boundary of the color gamut.

FIG. 5 is a diagram for schematically explaining a relation between the width of the weight $W_{ij}$ and the color difference distance d of the first color signal to the outer boundary of the color gamut. The "width of the weight $W_{ij}$" in FIG. 5 is an example of generation conditions of the color conversion characteristic, and the generation conditions are changed according to the color difference distance d. For example, the width of the weight $W_{ij}$ may be defined by use of the color difference distance d in the color space where the weight $W_{ij}$ determined by the first function $F_{ij}$ and the second function $G_{ij}$ is assigned to the actual data sets in the case of the weight $W_{ij}$ being not less than a predetermined value. For instance, "the width of the weight $W_{ij}$" may be defined as a half width of the maximum weight $W_{ij}$.

As shown in FIG. 5, the width of the weight $W_{ij}$ becomes maximum where the color difference distance d is zero (d=0), that is, on the outer boundary of the color gamut, then gradually decreases as the color difference distance d becomes longer, and is set to a predetermined width where the color difference distance d is not less than $d_0$ (d≧$d_0$). The color difference distance $d_0$ may be set as a color difference distance $d_0$ of an area so that a sufficient number of actual data pairs (($x_{1i}$, $x_{2i}$, $x_{3i}$, $x_{4i}$), ($y_{1i}$, $y_{2i}$, $y_{3i}$)) for obtaining the real color conversion characteristic through calculation is included in the area and the weight $W_{ij}$ is assigned to the actual data sets in the area under the condition that the weight $W_{ij}$ is set to have the predetermined width.

In this way, by use of the width of the weight $W_{ij}$ that is set according to the relation with the color difference distance d as shown in FIG. 5, the actual data pairs located in the wider area (the shaded area in FIG. 4) around the outer boundary of the color gamut are used to calculate the sum of squares $E_j$ in Equation 5. Consequently, the local liner regression analysis with the sum of squares $E_j$ is performed for the first color signal located around the outer boundary of the color gamut, thereby figuring out the estimated values that are closer to the real color conversion characteristic.

Here, coefficients for controlling the width of the weight $W_{ij}$ in the first function $F_{ij}$ and the second function $G_{ij}$ are the constants for normalization ($x_{10}$, $x_{20}$, $x_{30}$, $x_{40}$), ($y_{10}$, $y_{20}$, $y_{30}$). Accordingly, the weight data generator 23 of the first exemplary embodiment specifies variables for normalization ($x_{10}$(d), $x_{20}$(d), $x_{30}$(d), $x_{40}$(d)), ($y_{10}$(d), $y_{20}$(d), $y_{30}$(d)) for determining the width of the weight $W_{ij}$ according to the color difference distance d so that the width would form, for example, the relation shown in FIG. 5. Then, the weight data generator 23 generates the first function $F_{ij}$ and the second function $G_{ij}$ having the constants for normalization in Equations 6 and 7 replaced with the variables for normalization ($x_{10}$(d), $x_{20}$(d), $x_{30}$(d), $x_{40}$(d)), ($y_{20}$(d), $y_{20}$(d), $y_{30}$(d)).

In other words, the weight data generator 23 of the first exemplary embodiment generates the following Equations 10 and 11 for changing the width of the weight $W_{ij}$ according to the color difference distance d from the outer boundary of the color gamut. Then, the weight data generator 23 calculates the weight $W_{12ij}$ (=$W_{ij}$) by substituting Equations 10 and 11 thus generated into Equation 9. By using this weight $W_{ij}$, the matrix components $m_{11}$, $m_{12}$, $m_{13}$, $m_{14}$, ..., that minimize $E_j$ shown in Equation 5 are figured out in the least square method. Thereafter, the weight data generator 23 generates a matrix composed of the components $m_{11}$, $m_{12}$, $m_{13}$, $m_{14}$, ..., and sends the matrix to the color conversion unit 30.

$$W_{1ij}=F_{ij}(((x_{1i}-x_{1j})/x_{10}(d))^2+((x_{2i}-x_{2j})/x_{20}(d))^2+((x_{3i}-x_{3j})/x_{30}(d))^2+((x_{4i}-x_{4j})/x_{40}(d))^2) \quad (10)$$

$$W_{2ij} = G_{ij}(((m_{11}(x_{1i}-x_{1j}))^2 + (m_{12}(x_{2i}-x_{2j}))^2 + \\ (m_{13}(x_{3i}-x_{3j}))^2 + (m_{14}(x_{4i}-x_{4j}))^2)/(y_{10}(d))^2 + \\ ((m_{21}(x_{1i}-x_{1j}))^2 + (m_{22}(x_{2i}-x_{2j}))^2 + (m_{23}(x_{3i}-x_{3j}))^2 + \\ (m_{24}(x_{4i}-x_{4j}))^2)/(y_{20}(d))^2 + \\ ((m_{31}(x_{1i}-x_{1j}))^2 + (m_{32}(x_{2i}-x_{2j}))^2 + (m_{33}(x_{3i}-x_{3j}))^2 + \\ (m_{34}(x_{4i}-x_{4j}))^2)/(y_{30}(d))^2) \quad (11)$$

Note that, as the method for estimating the color conversion characteristic in the color processing apparatus 1 of the first exemplary embodiment, any kind of method for estimating the color conversion characteristic by use of weighted data pairs may be employed in addition to the above-mentioned method, which is statistical processing, of performing the liner regression analysis using weighted actual data pairs. The employable methods include a method, which is interpolating processing, of performing interpolation by simply calculating a weighted average of actual data pairs, a method, which is statistical processing, using a neural network obtained by learning weighted actual data pairs, and the like.

The forgoing description shows the case where color signals (second color signals) in the L*a*b* color space are estimated from color signals (first color signals) in the CMYK color space obtained by the image data input unit 10, and where colors not included in the actual data pairs are generated. In the color processing apparatus 1 of the first exemplary embodiment, the weight $W_{ij}$ according to the color difference distance d from the outer boundary of the color gamut is set by the weight data generator 23 also in a case where color signals in the L*a*b* color space are firstly obtained by the image data input unit 10, and where then color signals in the CMYK color space are estimated from the obtained color signals in the L*a*b* color space.

Hereinafter, descriptions will be provided for the setting of the weight $W_{ij}$ according to the color difference distance d from the outer boundary of the color gamut in a case where a color signal in the CMYK color space is estimated from a color signal in the L*a*b* color space. Here, presented is a configuration in which the image data input unit 10 inputs color signals in the L*a*b* color space, as the first color signals in FIG. 1, to the color conversion unit 30, and in which the color conversion unit 30 outputs color signals in the CMYK color space, as the second color signals, to the image data output unit 40.

Figure 6:
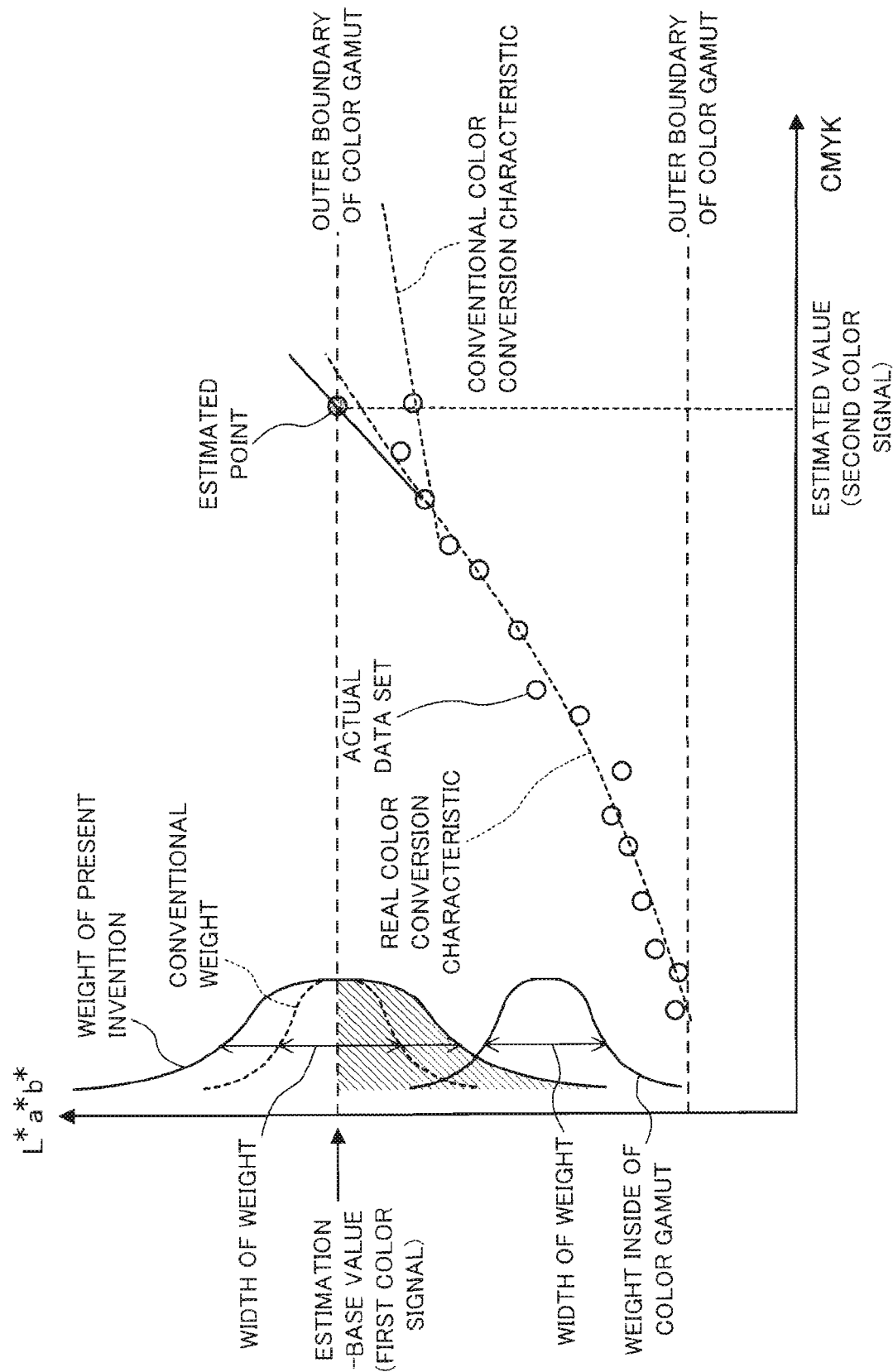
FIG. 6 is a diagram for explaining weight determined by a first function and a second function for a case where second color signals in the CMYK color spaces as output signals, are estimated from first color signals in the L*a*b* color space, as input signals.

FIG. 6 is a diagram for explaining weight $W'_{ij}$ determined by a first function $F_{ij}$ and a second function $G_{ij}$ for a case where second color signals in the CMYK color space, as output signals, are estimated from first color signals in the L*a*b* color space, as input signals.

In order to estimate the second color signals in the CMYK color space from the first color signals in the L*a*b* color space as shown in FIG. 6, Equation 6 might be calculated inversely (an inverse operation might be performed) However, since Equation 6 includes the estimation-base values of the three-dimensional first color signal ($y_{1j}$, $y_{2j}$, $y_{3j}$) and the estimated values of the four-dimensional second color signal ($x_{1j}$, $x_{2j}$, $x_{3j}$, $x_{4j}$), Equation 6 has a shortage of a known value. As a result, Equation 6 may not be uniquely solved through the inverse operation. In this case, a part of the second color signal, for example, ($x_{4j}$) is designated as an estimation-base value, the rest of the second color signal, that is, the estimated values, for example, ($x_{1j}, x_{2j}, x_{3j}$) is figured out. To be more precise, in a general method, "K" in the CMYK color space is calculated in the first place. For instance, a usable method is to design K coordinates in the CMYK color space corresponding to the color coordinates (L*, a*, b*) in the L*a*b* color space in advance, or to directly input the color coordinates (L*, a*, b*) and the K coordinates as input signals.

Note that, in a case where there is not included processing of calculating "K" in the CMYK color space from the color coordinates (L*, a*, b*) in the L*a*b* color space, the second color signal may be estimated through the inverse operation of Equation 6. This is because the estimation-base values are the three-dimensional first color signal (L*, a*, b*), and the estimated values are the three-dimensional second color signal (C, M, Y) In this case, the color coordinates (L*, a*, b*, K) are inputted as the first color signal, and the color coordinates (C, M, Y, K) are outputted as the second color signal in FIG. 1.

Figure 7:
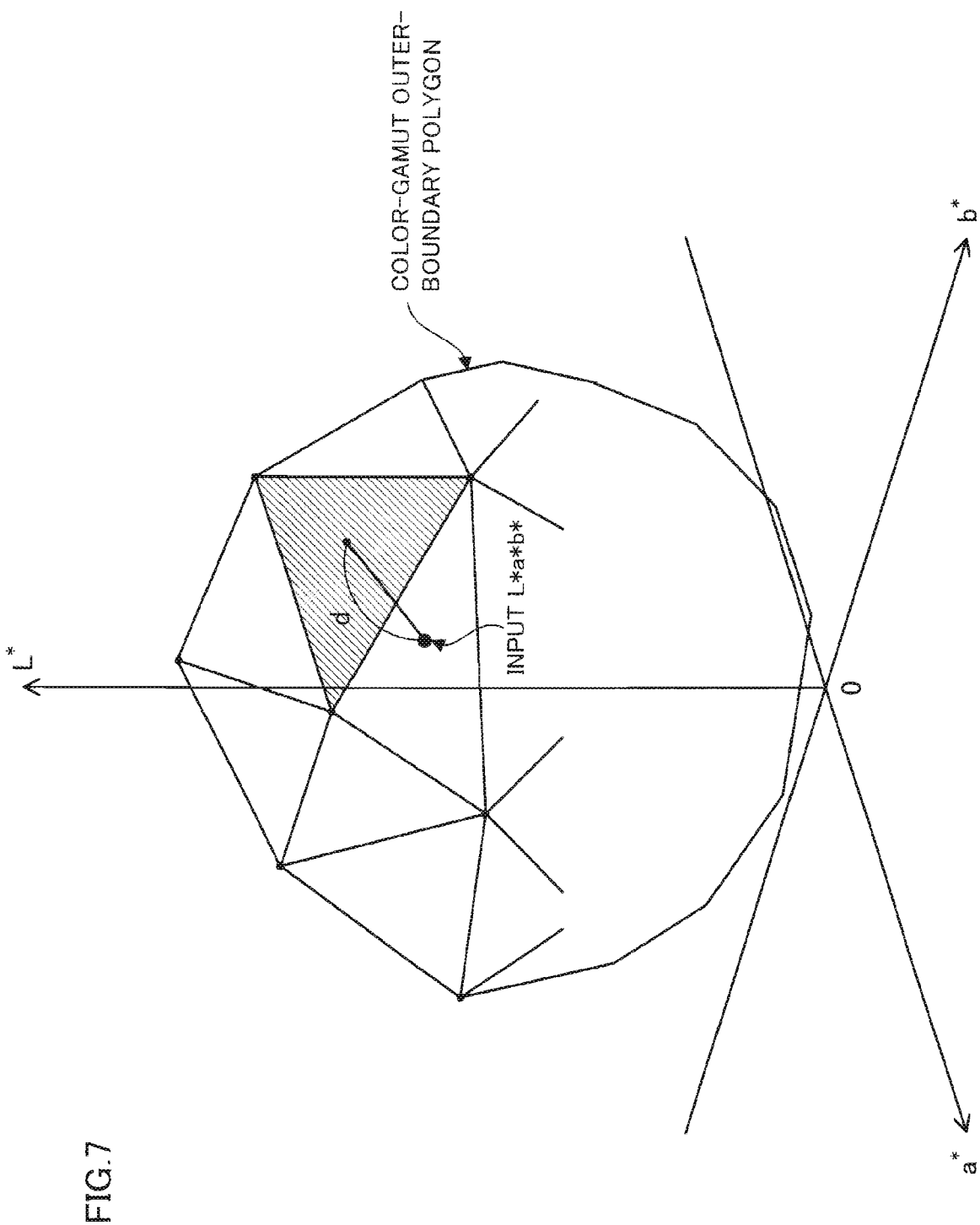
FIG. 7 is a diagram for explaining the color difference distance in the L*a*b* color space.

In this case, the color-gamut distance calculator 21 is not capable of calculating the color difference distance d by using the above-mentioned color coordinate values (C, M, Y, K) in the CMYK color space. For this reason, for example, as shown in FIG. 7 (a diagram for explaining the color difference distance d in the L*a*b* color space), the outer boundaries of the color gamut in the L*a*b* color space are expressed as a polygon (polyhedron). Then, the distance (color difference distance) d of the first color signal (L*, a*, b*) to the color-gamut outer-boundary polygon is obtained by calculating the distance to the plane constituting the color-gamut outer-boundary polygon.

Moreover, as is similar to the above-mentioned case, the weight data generator 23 controls the width of the weight $W'_{ij}$ according to the color difference distance d of the first color signal to the outer boundary of the color gamut, the distance d obtained from the color-gamut distance calculator 21.

In the present case, the weight $W'_{ij}$ is controlled in the L*a*b* color space. For example, as shown in Equation 12, a difference between each pair of corresponding signal components of the first color signal ($y_{1j}, y_{2j}, y_{3j}$) of the estimation-base values, and the actual data sets ($y_{1i}, y_{2i}, y_{3i}$) of the first color signal is normalized. Then, the second weight $W'_{2ij}$ is determined by the second function $G_{ij}$ that is the monotonously decreasing function of the obtained normalized signal with respect to the Euclidean distance. In addition, as shown in the following Equation 13, a difference between a pair of corresponding signal components, for example, ($x_{4j}$) (="K") of the second color signal ($x_{1j}, x_{2j}, x_{3j}, x_{3j}$) of the estimated values, and the actual data set ($x_{4j}$) is normalized, and thus the normalized signal is obtained from the difference component of the second color signal ("K"). Thereafter, the first weight $W'_{1ij}$ is determined by the first function $F_{ij}$ that is the monotonous decreasing function of the obtained normalized signal with respect to the Euclidean distance. After that, the two kinds of weight are combined by a function H shown in Equation 14 to form weight $W'_{12ij}$ (=$W'_{ij}$). Then, the $W'_{12ij}$ (=$W'_{ij}$) is used.

$$W'_{2ij}=G_{ij}(((y_{1i}-y_{1j})/y_{10})^2+((y_{2i}-y_{2j})/y_{20})^2+((y_{3i}-y_{3j})/y_{30})^2) \quad (12)$$

$$W'_{1ij}=F_{ij}(((x_{4i}-x_{4j})/x_{40})^2) \quad (13)$$

$$W'_{12ij}=H(W'_{1ij}, W'_{2ij}) \quad (14)$$

Figure 8:
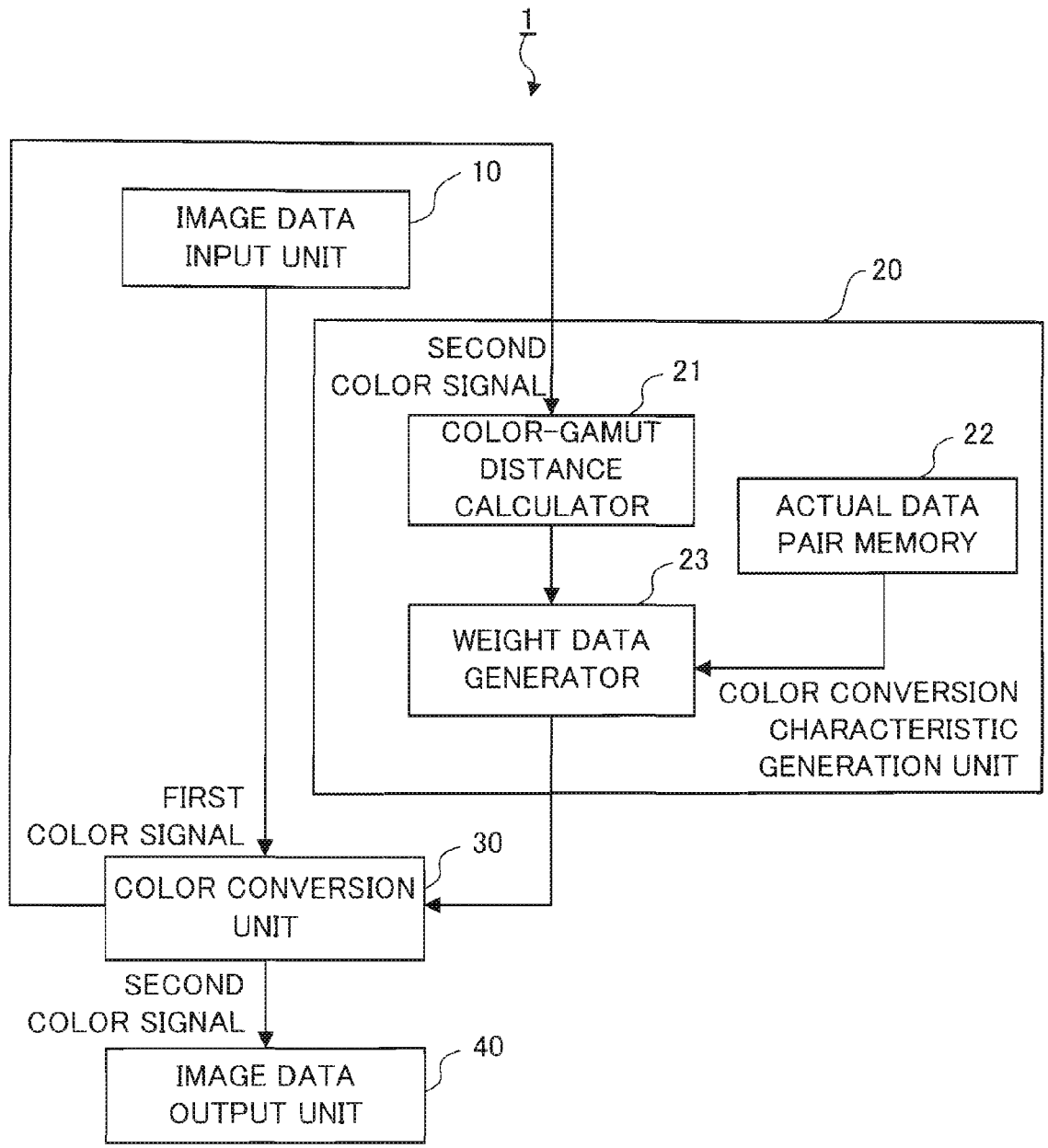
FIG. 8 is a diagram showing a configuration in which the color-gamut distance calculator figures out the color difference distance by use of the second color signal calculated by the color conversion unit.

Incidentally, the color-gamut distance calculator 21 may also obtain the color difference distance d in the L*a*b* color space by use of a method not preparing the color-gamut outer-boundary polygon. For example, when the first color signal (L*, a*, b*, K) is inputted, the color conversion unit 30 firstly performs color conversion with the set parameters (weight) and thereby calculates the second color signal (C, M, Y, K). Next, as shown in FIG. 8 (a diagram showing a configuration in which the color-gamut distance calculator 21 figures out the color difference distance d by use of the second color signal calculated by the color conversion unit 30), the calculated second color signal (C, M, Y, K) is transmitted to the color-gamut distance calculator 21. The color-gamut distance calculator 21 calculates the color difference distance d by use of the second color signal (C, M, Y, K) obtained from the color conversion unit 30 in the same manner as the above-mentioned one. According to the newly-calculated color difference d, the weight may also be controlled, and the color conversion unit 30 may again convert the first color signal (L*, a*, b*, K) to the second color signal (C, M, Y, K).

As has been described above, in the color processing apparatus 1 of the first exemplary embodiment, when the color conversion characteristic is estimated, the weight (weighting) to be assigned to actual data pairs is controlled according to the color difference distance d that is a distance of an input signal (first color signal) as the estimation-base values to the outer boundary of the color gamut. This allows the estimated values for the estimation-base values located around the outer boundary of the color gamut to be also accurately calculated, and thereby improves color reproducibility.

Second Exemplary Embodiment

The first exemplary embodiment provides the descriptions for the configuration for improving the accuracy of the estimated values for the estimation-base values located around the outer boundary of the color gamut by adjusting the width of the weight $W_{ij}$. The second exemplary embodiment provides the descriptions for a configuration for improving the accuracy of the estimated values for the estimation-base values located around the outer boundary of the color gamut by shifting the center of the weight $W_{ij}$ to the inside of the color gamut. Incidentally, the same reference numerals are used for the same components as those in the first exemplary embodiment, and the detailed explanations thereof are omitted here.

Figure 9:
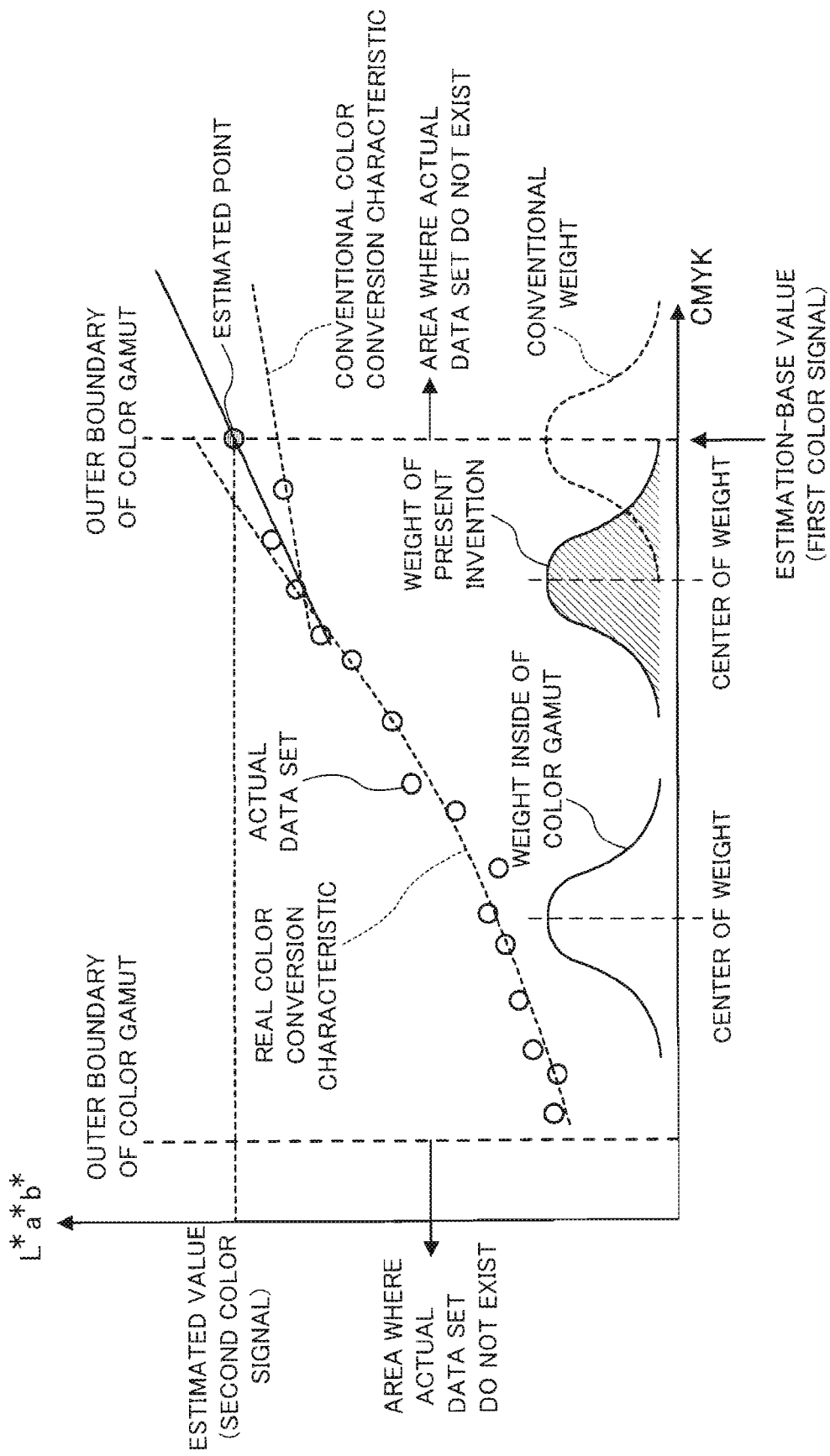
FIG. 9 is a diagram for explaining the weight determined by a first function and a second function generated by a weight data generator of the second exemplary embodiment.

FIG. 9 is a diagram for explaining the weight $W_{ij}$ determined by a first function $F_{ij}$ and a second function $G_{ij}$ generated by a weight data generator 23 of the second exemplary embodiment. As shown in FIG. 9, the first function $F_{ij}$ and the second function $G_{ij}$ generated by the weight data generator 23 of the second exemplary embodiment set the weight $W_{ij}$ for actual data sets in an area inside of the color gamut farther from the outer boundary of the color gamut as the color difference distance d is smaller, under the condition that the color difference distance d between an input signal and the outer boundary of the color gamut is not more than the predetermined value in the area. Specifically, the weight data generator 23 generates the first function $F_{ij}$ and the second function $G_{ij}$ so that, as the color difference distance d is smaller, the center position of an area is larger shifted from the input signal (estimation-base values) to the inside of the color gamut, and the area includes actual data pairs to which the weight $W_{ij}$ is to be assigned. With these functions, as compared with the area where the conventional weight is assigned to actual data sets, the weight $W_{ij}$ is assigned to actual data sets ($x_{1i}, x_{2i}, x_{3i}, x_{4i}$) located in an area inside of the color gamut (a shaded area in FIG. 9) farther from the outer boundary of the color gamut, and thus the sum of squares $E_j$ in Equation 5 is calculated. Consequently, the local liner regression analysis with the sum of squares $E_j$ is performed for the input signal located around the outer boundary of the color gamut, thereby figuring out the estimated values (an estimated point shown in FIG. 9) that are closer to the real color conversion characteristic.

Figure 10:
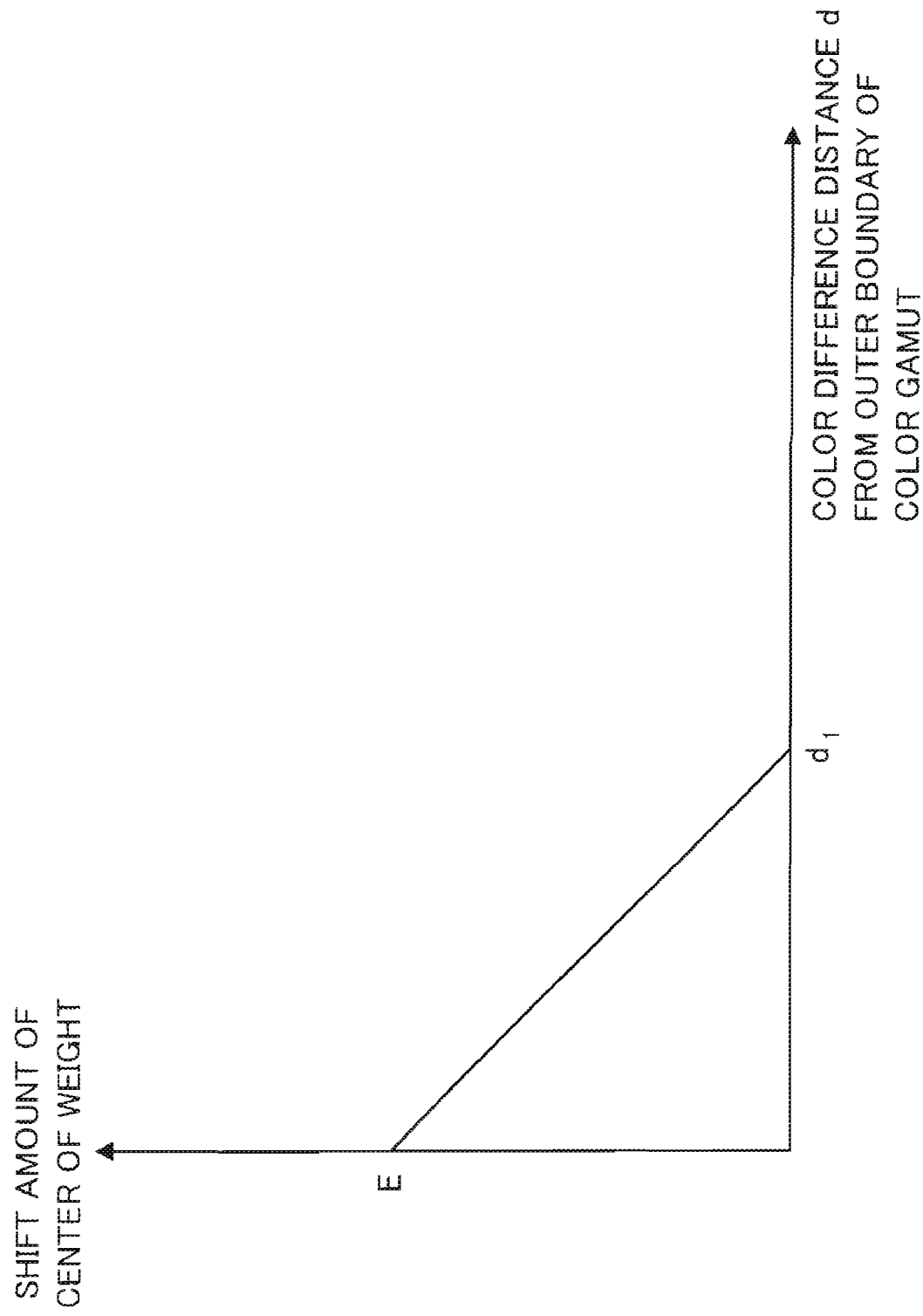
FIG. 10 is a diagram for schematically explaining a relation between the shift amount of the center of the weight and the color difference distance from an input signal (first color signal) to the outer boundary of the color gamut.

FIG. 10 is a diagram for schematically explaining a relation between the shift amount of the center of the weight $W_{ij}$ and the color difference distance d from an input signal (first color signal) to the outer boundary of the color gamut. As shown in FIG. 10, the center of the weight $W_{ij}$ is shifted by the maximum shift amount E where the color difference distance d is zero (d=0). The shift amount E gradually decreases as the color difference distance d becomes larger. Then, the center of the weight $W_{ij}$ is set not to be shifted (the shift amount=0) in a range where color difference distance d is not less than $d_1$ (d≧$d_1$). The color difference distance $d_1$ and the maximum shift amount E may be set as a color difference distance $d_1$ and a maximum shift amount E of an area so that a sufficient number of actual data pairs (($x_{1i}$, $x_{2i}$, $x_{3i}$, $x_{4i}$), ($y_{1i}$, $y_{2i}$, $y_{3i}$)) for calculating the real color conversion characteristic is included in the area and the weight $W_{ij}$ is assigned to the actual data sets in the area under the condition that the width of the weight $W_{ij}$ is set to a predetermined value, for example. Here, the shift amount of the center of the weight $W_{ij}$ is an example of the generation conditions for generating the color conversion characteristic that is to be changed according to the color difference distance d.

In this way, by use of the weight $W_{ij}$ whose center is shifted according to the relation with the color difference distance d as shown in FIG. 10, actual data pairs located in a wider area (the shaded area in FIG. 9) around the outer boundary of the color gamut are used to calculate the sum of squares $E_j$ in Equation 5. Consequently, the local liner regression analysis with the sum of squares $E_j$ is performed for the first color signal located around the outer boundary of the color gamut, thereby figuring out the estimated values that are closer to the real color conversion characteristic.

The following Equations 15 and 16 show the first function $F_{ij}$ and the second function $G_{ij}$, respectively, that set the center of the weight $W_{ij}$ to be shifted toward the inside of the color gamut according to the relation in FIG. 10. The weight data generator 23 of the second exemplary embodiment generates the first function $F_{ij}$ and the second function $G_{ij}$, as shown in Equations 15 and 16, which cause the center of the weight $W_{ij}$ to be shifted according to the color difference distance d. Then, the weight data generator 23 calculates the weight $W_{12ij}$ (=$W_{ij}$) by substituting the generated Equations 15 and 16 into Equation 9. By using this weight $W_{ij}$, the matrix components $m_{11}$, $m_{12}$, $m_{13}$, $m_{14}$, . . . , that minimize $E_j$ shown in Equation 5 are figured out in the least square method. Thereafter, the weight data generator 23 generates a matrix composed of the components $m_{11}$, $m_{12}$, $m_{13}$, $m_{14}$, . . . , and sends the matrix to the color conversion unit 30.

Here, $X_{kj}$(d) in Equations 15 and 16 is deviated from Equation 17 for setting, for example, the relation shown in FIG. 10. Incidentally, k denotes an integer from 1 to 4.

$$w_{1ij}=F_{ij}(((x_{1i}-x_{1j}(d))/x_{10})^2+((x_{2i}-x_{2j}(d))/x_{20})^2+((x_{3i}-x_{3j}(d))/x_{30})^2+((x_{4i}-x_{4j}(d))/x_{40})^2) \quad (15)$$

$$w_{2ij} = G_{ij}(((m_{11}(x_{1i} - x_{1j}(d)))^2 + (m_{12}(x_{2i} - x_{2j}(d)))^2 + (m_{13}(x_{3i} - x_{3j}(d)))^2 + (m_{14}(x_{4i} - x_{4j}(d)))^2)/(y_{10})^2 + ((m_{21}(x_{1i} - x_{1j}(d)))^2 + (m_{22}(x_{2i} - x_{2j}(d)))^2 + (m_{23}(x_{3i} - x_{3j}(d)))^2 + (m_{24}(x_{4i} - x_{4j}(d)))^2)/(y_{20})^2 + ((m_{31}(m_{1i} - x_{1j}(d)))^2 + (m_{32}(x_{2i} - x_{2j}(d)))^2 + (m_{33}(x_{3i} - x_{3j}(d)))^2 + (m_{34}(x_{4i} - x_{4j}(d)))^2)/(y_{30})^2) \quad (16)$$

$$\begin{cases} 0 \le d \le d_1 : x_{kj}(d) = x_{kj} - E(1 - d/d_1) \\ d_1 < d : x_{kj}(d) = x_{kj} \end{cases} \quad (k = 1\sim 4) \quad (17)$$

Figure 11:
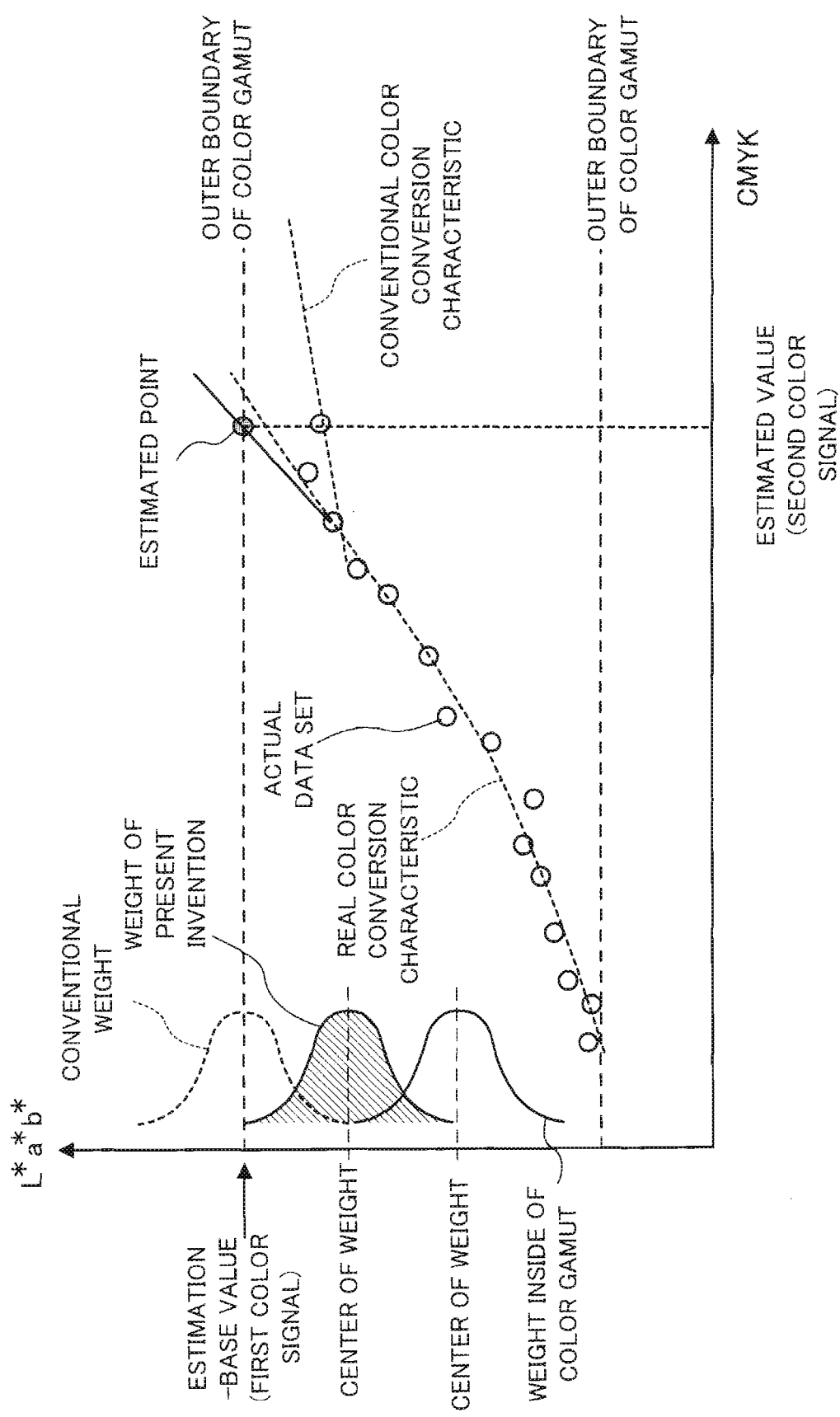
FIG. 11 is a diagram for explaining the weight determined by the first function and the second function of Equations 15 and 16 in a case where second color signals in the CMYK color space as output signals are estimated from first color signals in the L*a*b* color space as input signals.

Moreover, FIG. 11 is a diagram for explaining the weight $W_{ij}$ determined by the first function $F_{ij}$ and the second function $G_{ij}$ of Equations 15 and 16 in a case where second color signals in the CMYK color space as output signals are estimated from first color signals in the L*a*b* color space as input signals. As shown in FIG. 11, as is the case with the first exemplary embodiment, the second exemplary embodiment is also capable of estimating the color signals in the CMYK color space (second color signal) from the color signals in the L*a*b* color space (first color signal) by setting the weight $W_{ij}$ such that the center position of the weight $W_{ij}$ is shifted from the first color signal (estimation-base values) toward the inside of the color gamut.

Note that this program may be executed by loading, to a RAM, the program stored in a reserved area such as a hard disk or a DVD-ROM. In addition, another aspect of this program may be executed by a CPU while being prestored in a ROM. Moreover, when an apparatus is provided with a rewritable ROM such as an EEPROM, only this program is sometimes provided and installed in the ROM after the assembling of the apparatus is completed. In addition, this program may also be transmitted to an apparatus through a network such as the Internet and then installed in a ROM included in the apparatus, whereby the program is provided.

The above-mentioned description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain be principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
    a first color signal obtaining unit that obtains a first color signal in a first color space;
    a color conversion unit that converts the first color signal in the first color space obtained by the first color signal obtaining unit into a second color signal in a second color space according to a color conversion characteristic associating a color signal in the first color space with a color signal in the second color space;
    a calculation unit that calculates a distance of the first color signal to an outer boundary of a color gamut in the first color space; and
    a color conversion characteristic generation unit that generates the color conversion characteristic to be used by the color conversion unit to make the conversion, the color conversion characteristic generation unit changing a generation condition of the color conversion characteristic according to the distance of the first color signal calculated by the calculation unit, wherein the color conversion characteristic generation unit assigns weight to a plurality of color data pairs, the color data pair consisting of each of a plurality of color data sets in the first color space and a corresponding one of a plurality of color data sets obtained by measuring, in the second color space, a color of an image formed from each of the plurality of color data sets in the first color space, the color conversion characteristic generation unit generates the color conversion characteristic according to the plurality of color data pairs to which the weight has been assigned, and changes the weight that is assigned to the plurality of color data pairs according to the distance calculated by the calculation unit when the color conversion characteristic is generated.

2. The color processing apparatus according to claim 1, wherein the color conversion characteristic generation unit changes the weight to be assigned to the plurality of color data pairs located around any one of the first color signal and the second color signal.

3. A color processing apparatus comprising:
a first color signal obtaining unit that obtains a first color signal in a first color space;
a color conversion unit that converts the first color signal in the first color space obtained by the first color signal obtaining unit into a second color signal in a second color space according to a color conversion characteristic associating a color signal in the first color space with a color signal in the second color space;
a calculation unit that calculates a distance of the first color signal to an outer boundary of a color gamut in the first color space; and
a color conversion characteristic generation unit that generates the color conversion characteristic to be used by the color conversion unit to make the conversion, the color conversion characteristic generation unit changing a generation condition of the color conversion characteristic according to the distance of the first color signal calculated by the calculation unit, wherein
the color conversion characteristic generation unit assigns weight to a plurality of color data pairs, the color data pair consisting of each of a plurality of color data sets in the first color space and a corresponding one of a plurality of color data sets obtained by measuring, in the second color space, a color of an image formed from each of the plurality of color data sets in the first color space, the color conversion characteristic generation unit generates the color conversion characteristic according to the plurality of color data pairs to which the weight has been assigned, and changes the weight that is assigned to the plurality of color data pairs according to the distance calculated by the calculation unit when the color conversion characteristic is generated, and
the color conversion characteristic generation unit sets a wider width for an area including the plurality of color data pairs to which the weight is to be assigned, as the distance calculated by the calculation unit is smaller.

4. A color processing apparatus comprising:
a first color signal obtaining unit that obtains a first color signal in a first color space;
a color conversion unit that converts the first color signal in the first color space obtained by the first color signal obtaining unit into a second color signal in a second color space according to a color conversion characteristic associating a color signal in the first color space with a color signal in the second color space;
a calculation unit that calculates a distance of the first color signal to an outer boundary of a color gamut in the first color space; and
a color conversion characteristic generation unit that generates the color conversion characteristic to be used by the color conversion unit to make the conversion, the color conversion characteristic generation unit changing a generation condition of the color conversion characteristic according to the distance of the first color signal calculated by the calculation unit, wherein
the color conversion characteristic generation unit assigns weight to a plurality of color data pairs, the color data pair consisting of each of a plurality of color data sets in the first color space and a corresponding one of a plurality of color data sets obtained by measuring, in the second color space, a color of an image formed from each of the plurality of color data sets in the first color space, the color conversion characteristic generation unit generates the color conversion characteristic according to the plurality of color data pairs to which the weight has been assigned, and changes the weight that is assigned to the plurality of color data pairs according to the distance calculated by the calculation unit when the color conversion characteristic is generated, and
the color conversion characteristic generation unit shifts, by a shift amount, a center position of an area including the plurality of color data pairs to which the weight is to be assigned, toward inside of the color gamut in the first color space so that the shift amount would become larger as the distance calculated by the calculation unit is smaller.

5. The color processing apparatus according to claim 1, wherein the color conversion characteristic generation unit generates the color conversion characteristic by performing interpolation processing on the plurality of color data pairs to which the weight has been assigned.

6. The color processing apparatus according to claim 1, wherein the color conversion characteristic generation unit generates the color conversion characteristic by performing statistic processing on the plurality of color data pairs to which the weight has been assigned.

7. A color processing method comprising:
obtaining a first color signal in a first color space;
calculating a distance of the obtained first color signal to an outer boundary of a color gamut in the first color space;
generating a color conversion characteristic by using a different generation condition according to the calculated distance of the first color signal, the color conversion characteristic associating a color signal in the first color space with a color signal in a second color space;
converting the obtained first color signal into a second color signal in the second color space according to the color conversion characteristic; and
generating the color conversion characteristic according to a plurality of color data pairs to which a weight has been assigned by changing the weight that is to be assigned to the plurality of color data pairs according to the distance, the color data pair consisting of each of a plurality of color data sets in the first color space, and a corresponding one of a plurality of color data sets obtained by measuring, in the second color space, a color of an image formed from each of the plurality of color data sets in the first color space.

8. A non-transitory computer readable medium storing a computer readable program for causing a computer to execute a process for color processing, the process comprising:

obtaining a first color signal in a first color space;

calculating a distance of the obtained first color signal to an outer boundary of a color gamut in the first color space;

generating a color conversion characteristic by using a different generation condition according to the calculated distance of the first color signal, the color conversion characteristic associating a color signal in the first color space with a color signal in a second color space; and converting the obtained first color signal into a second color signal in the second color space according to the generated color conversion characteristic, wherein, in the process of generating the color conversion characteristic, the color conversion characteristic is generated according to a plurality of color data pairs to which a weight has been assigned by changing the weight that is to be assigned to the plurality of color data pairs according to the distance, the color data pair consisting of each of a plurality of color data sets in the first color space and a corresponding one of a plurality of color data sets obtained by measuring, in the second color space, a color of an image formed from each of the plurality of color data sets in the first color space.

9. The non-transitory computer readable medium storing a computer readable program according to claim 8, wherein, in the process of generating the color conversion characteristic, the weight to be assigned to the plurality of color data pairs located around the first color signal are changed.

10. A non-transitory computer readable medium storing a computer readable program for causing a computer to execute a process for color processing, the process comprising:

obtaining a first color signal in a first color space;

calculating a distance of the obtained first color signal to an outer boundary of a color gamut in the first color space;

generating a color conversion characteristic by using a different generation condition according to the calculated distance of the first color signal, the color conversion characteristic associating a color signal in the first color space with a color signal in a second color space; and converting the obtained first color signal into a second color signal in the second color space according to the generated color conversion characteristic, wherein, in the process of generating the color conversion characteristic, the color conversion characteristic is generated according to a plurality of color data pairs to which a weight has been assigned by changing the weight that is to be assigned to the plurality of color data pairs according to the distance, the color data pair consisting of each of a plurality of color data sets in the first color space and a corresponding one of a plurality of color data sets obtained by measuring, in the second color space, a color of an image formed from each of the plurality of color data sets in the first color space, and in the process of generating the color conversion characteristic, a width of an area including the plurality of color data pairs to which the weight is assigned is set to be wider, as the calculated distance is smaller.

11. A non-transitory computer readable medium storing a computer readable program for causing a computer to execute a process for color processing, the process comprising:

obtaining a first color signal in a first color space;

calculating a distance of the obtained first color signal to an outer boundary of a color gamut in the first color space;

generating a color conversion characteristic by using a different generation condition according to the calculated distance of the first color signal, the color conversion characteristic associating a color signal in the first color space with a color signal in a second color space; and converting the obtained first color signal into a second color signal in the second color space according to the generated color conversion characteristic, wherein, in the process of generating the color conversion characteristic, the color conversion characteristic is generated according to a plurality of color data pairs to which a weight has been assigned by changing the weight that is to be assigned to the plurality of color data pairs according to the distance, the color data pair consisting of each of a plurality of color data sets in the first color space and a corresponding one of a plurality of color data sets obtained by measuring, in the second color space, a color of an image formed from each of the plurality of color data sets in the first color space, and in the process of generating the color conversion characteristic, a center position of an area including the plurality of color data pairs to which the weight is to be assigned is shifted, by a shift amount, toward inside of the color gamut in the first color space so that the shift amount would become larger as the calculated distance is smaller.

12. The non-transitory computer readable medium storing a computer readable program according to claim 8, wherein, in the process of generating the color conversion characteristic, the generation condition of the color conversion characteristic is changed according to the distance in a case where the distance of the calculated first color signal is within a predetermined range.

\* \* \* \* \*